(12) United States Patent
Ungari et al.

(10) Patent No.: US 7,625,314 B2
(45) Date of Patent: Dec. 1, 2009

(54) ADAPTIVE TRAINING SYSTEM WITH AERIAL MOBILITY SYSTEM

(75) Inventors: Joseph L. Ungari, Seattle, WA (US); Steven J. Staihar, Hillsboro, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 11/742,264

(22) Filed: Apr. 30, 2007

(65) Prior Publication Data

US 2008/0269016 A1 Oct. 30, 2008

(51) Int. Cl.
A63B 71/00 (2006.01)
(52) U.S. Cl. .................. 482/1; 482/8; 482/9
(58) Field of Classification Search ............. 482/1, 482/4, 8, 9, 901; 901/1, 46, 47; 700/253, 700/255, 257, 258, 259, 302; 701/26; 434/247–261
See application file for complete search history.

(56) References Cited

U.S. PATENT DOCUMENTS

| | | | | |
|---|---|---|---|---|
| 2,538,910 A * | 1/1951 | Miller | ............ | 348/157 |
| 3,888,023 A | 6/1975 | Genin | | |
| 3,935,380 A * | 1/1976 | Coutta | ............ | 348/150 |
| 4,534,557 A | 8/1985 | Biiglow et al. | | |
| 4,578,769 A | 3/1986 | Frederick | | |
| 4,703,445 A | 10/1987 | Dassler | | |
| 4,710,819 A * | 12/1987 | Brown | ............ | 348/144 |
| 5,083,968 A * | 1/1992 | Hart | ............ | 446/431 |
| 5,224,426 A * | 7/1993 | Rodnunsky et al. | ............ | 104/112 |
| 5,241,380 A * | 8/1993 | Benson et al. | ............ | 348/143 |
| 5,363,305 A * | 11/1994 | Cox et al. | ............ | 701/200 |
| 5,400,244 A * | 3/1995 | Watanabe et al. | ............ | 701/28 |
| 5,524,637 A | 6/1996 | Erickson | | |
| 5,527,239 A | 6/1996 | Abbondanza | | |
| 5,568,189 A * | 10/1996 | Kneller | ............ | 348/144 |
| 5,752,088 A * | 5/1998 | Desselle | ............ | 396/12 |
| 5,819,008 A * | 10/1998 | Asama et al. | ............ | 700/255 |
| 5,916,063 A | 6/1999 | Alessandri | | |
| 5,938,564 A | 8/1999 | Bachman | | |
| 6,132,337 A | 10/2000 | Krupka et al. | | |
| 6,220,865 B1 * | 4/2001 | Macri et al. | ............ | 434/247 |
| 6,428,449 B1 | 8/2002 | Apseloff | | |
| 6,567,044 B2 * | 5/2003 | Carroll | ............ | 342/465 |
| 6,873,355 B1 * | 3/2005 | Thompson et al. | ............ | 348/144 |
| 6,917,855 B2 * | 7/2005 | Gonzalez-Banos et al. | ... | 700/245 |
| 6,921,351 B1 | 7/2005 | Hickman et al. | | |
| 6,968,592 B2 * | 11/2005 | Takeuchi et al. | ............ | 15/319 |
| 6,975,089 B2 * | 12/2005 | Rodnunsky et al. | ............ | 318/649 |
| 6,997,853 B1 | 2/2006 | Cuskaden et al. | | |
| 7,088,071 B2 * | 8/2006 | Rodnunsky | ............ | 318/649 |
| 7,219,438 B2 * | 5/2007 | Amron et al. | ............ | 33/289 |
| 7,239,106 B2 * | 7/2007 | Rodnunsky et al. | ............ | 318/649 |
| 2002/0082143 A1 | 6/2002 | Leeds | | |
| 2003/0151554 A1 | 8/2003 | McCarthy | | |
| 2004/0014567 A1 | 1/2004 | Mendel | | |
| 2004/0158358 A1 * | 8/2004 | Anezaki et al. | ............ | 700/264 |

(Continued)

FOREIGN PATENT DOCUMENTS

JP 54141679 11/1979

*Primary Examiner*—Fenn C Mathew
*Assistant Examiner*—Andrew M Tecco
(74) *Attorney, Agent, or Firm*—Plumsea Law Group, LLC

(57) ABSTRACT

A mobile unit configured to train an athlete is disclosed. The mobile unit includes multiple sensors, communication devices and a mobility system. The mobile unit executes one or more training paths to simulate chasing associated with various sports. The mobile unit is capable of determining its own location and the location of the athlete throughout a training session, as well as other information. The mobile unit is configured to adapt the training path to stress weaknesses of the athlete with respect to various types of athletic skills.

14 Claims, 24 Drawing Sheets

U.S. PATENT DOCUMENTS

| | | |
|---|---|---|
| 2004/0219498 A1 | 11/2004 | Davidson |
| 2005/0164832 A1 | 7/2005 | Maschke |
| 2005/0197749 A1* | 9/2005 | Nichols et al. ................ 701/3 |
| 2006/0058921 A1* | 3/2006 | Okamoto .................... 700/255 |
| 2006/0106496 A1* | 5/2006 | Okamoto .................... 700/253 |
| 2006/0126918 A1* | 6/2006 | Oohashi et al. ............. 382/153 |
| 2007/0200027 A1* | 8/2007 | Johnson ...................... 244/3.1 |
| 2007/0200525 A1* | 8/2007 | Kanaoka ................ 318/568.21 |
| 2007/0250260 A1* | 10/2007 | Ariyur et al. ................ 701/207 |

* cited by examiner

ADAPTIVE TRAINING SYSTEM WITH AERIAL MOBILITY SYSTEM

BACKGROUND OF THE INVENTION

1. Field of the Invention

The present invention relates generally to training systems, and in particular to adaptive training systems including a mobile unit that is air-based.

2. Description of Related Art

When an athlete trains for a particular activity they may choose to focus on their weaknesses as well as their strengths. Many times, an athlete that is well rounded has an advantage over other competitors that are only strong in one particular aspect of an athletic activity or sport. Therefore, in selecting a workout routine or program, an athlete (or the athlete's coach) may adapt a given routine or program so that it stresses weaknesses in the athlete's performance.

In many situations, the athlete's weaknesses may not be well known. In such situations it may be useful to have a training system that is configured to evaluate the athlete's performance. Based on this evaluation, a coach or the athlete may make modifications to the training method in an attempt to stress the athlete's weaknesses according to the reported performance.

Several methods and/or devices configured to train an athlete have been previously proposed, including mechanisms for measuring various aspects of the athlete's performance. Davidson (U.S. patent number 2004/0219498) teaches a training system consisting of a computer and a trainer and/or trainee garment configured to accurately track body movements of the wearer. These body movements are then compared to reference body movements and a report is generated with the results of the comparison. In some cases, the reference body movements are generated by a coach or other trainer. For example, a trainee may wish to learn the ideal golf swing, and by comparing their body movements of the swing with the pre-programmed body movements of a golf-pro's swing, they may learn weaknesses in their swing and adapt it to conform closer to the reference swing.

A drawback of the Davidson design is the cumbersome nature of the trainer/trainee garments. In many cases, such garments could prohibit a full range of motion, decreasing the utility of the training system in such circumstances. Furthermore, the Davidson design is primarily intended to be used as a tool for comparing an athlete's body movements with the body movements of a secondary party (a coach, trainer, etc.). The Davidson design does not provide a straightforward means of comparing various aspects of the athlete's performance with one another. Finally, the Davidson design does not provide a clear method for focusing on and stressing weaknesses in the athlete's performance, and especially not in an automated manner.

Bachman (U.S. Pat. No. 5,938,564) teaches a track runner pacing device, including a running track. In the Bachman design, a pacer housing is adapted to move around the running track. The Bachman design also incorporates a control mechanism that effects the movement of the pacer housing about the track at a speed calculated from a distance and a time entered into the control means by a user.

The Bachman design includes several drawbacks. Bachman teaches the use of a pacer housing with a simple rounded track. Although the athlete must turn slightly in order to make their way fully around the track, this training device is generally configured only to stress linear speed and pacing. The Bachman design would not be well suited for training athlete's in sports where one is not confined to a track. In football, for example, an athlete must perform 'cut-moves' and general lateral translations that could not be modeled using the Bachman design. Additionally, using the Bachman design, an athlete (or a coach) must program information that is used to calculate a predefined pacing speed for the pacer housing. The Bachman design lacks a provision for automatically adapting the pacer housing speed to stress weaknesses in the athlete's performance.

Dassler (U.S. Pat. No. 4,703,445) teaches an athletic shoe for running and a process for providing an exchange of information concerning moving sequences. In the Dassler design, a transmitter is housed in a free space of the sole of the shoe, which, via a sensor in the sole, can emit at least one output signal. Following the transmission of the signal, a remote receiver receives the emissions. Also, a secondary transmitter and sensor may be associated with a second shoe, whose emissions are also received by the remote receiver either directly or indirectly via the first transmitter. The remote receiver may be linked with a computer. Using the information collected from these emissions, the computer may determine the distance between the first and the second shoes, on the basis of the delay between the receipt by the remote receiver of the directly and indirectly received emissions, as well as other characteristic length values related to stride rate or length. Based on this computed information, which may be stored and later analyzed, conclusions may be drawn with respect to further training phases or sequences and possibly different training phases or sequences.

A drawback of the Dassler design is that it is configured to assess only information related to stride length and/or running speed. The Dassler design lacks provisions for locating the runner along a given trajectory or path, and determining performance aspects of the athlete associated with lateral motions, banking motions, and starting and/or stopping motions. Furthermore, while the Dassler design provides tools for analyzing an athlete's running style, it does not directly provide the athlete with a means for stressing particular weaknesses in their running style. Instead, the athlete and/or coach must analyze the acquired running data and make their own judgments about new training regiments.

In some training exercises, it may be useful to have a training device that can sense the location of the athlete and either move away from, or towards the athlete. In the prior art, devices with such features are usually associated with robots. Several such devices have been previously proposed.

Oohashi (U.S. patent number 2006/0126918) teaches a robot provided with a target object detection apparatus. The target object detection apparatus includes a wireless tag worn by the target object and a camera used for recording image information. Oohashi teaches the use of an RFID tag, in particular, with the target object detection apparatus. Oohashi also teaches the use of an image processor to interpret images recorded by the camera. The camera is configured to take images of the target object's face, and using the image processor, determine, with some associated probability, the identity of the target object.

A drawback to the Oohashi design is that it lacks provisions for use as an athletic training device. Although the robot does include legs for moving, Oohashi does not teach a robot that can run or move at speeds useful for athletic training. Furthermore, the RFID tag is used to signal the target objects identity, but not as a means of location. As a result, the Oohashi design lacks provisions for determining precise distances between the target object and the robot which serves as the target object detection apparatus.

Okamoto (U.S. patent number 2006/0106496) teaches a method of controlling the movement of a mobile robot. This method is intended to provide safe and appropriate accompanying behavior to follow an accompanied target. The Okamoto design includes provisions for detecting the position of the target. The Okamoto design also teaches a method for controlling the robot to walk along a path that is parallel to the moving direction of the accompanied target. The mobile robot includes a robot body, wheels for moving the robot, and a measurement apparatus that detects the position and velocity of the robot body and a calculator that calculates a path for accompanying the accompanied target based on measurements made by the measurement apparatus.

The Okamoto design lacks provisions that would allow its use as an athletic training device. Okamoto teaches a robot that moves in parallel with the target, while a proper training device may require that the robot move ahead of, behind, or in various other directions with respect to the athlete or target. Furthermore, while the Okamoto design includes a measurement apparatus for detecting the speed and location of the target, there are no provisions for storing and analyzing these measurements in order to examine trends in the targets motion as would be useful in a training apparatus.

Hart (U.S. Pat. No. 5,083,968) teaches an interactive toy that is capable of detecting and tracking any nearby heat source such as a human body. The Hart device is further able to move to interact with the heat source, including chasing the heat source, or running away from the heat source. The Hart device also includes sensors to detect unheated objects in its path and may move to avoid these objects.

Although the Hart design does provide a device that may chase or be chased, there are several limitations that limits its use as an athletic training device. Hart does not teach the use of instruments intended to measure the position and/or location of a human. Additionally, Hart fails to teach a mechanism by which the interactive toy can move at speeds relevant to athletic training, including speeds associated with running. Also, the Hart design lacks provisions for adapting to the movements of the human.

The prior art has many shortcomings, as previously discussed. There is a need in the art for a training device or system that may solve many of the problems not addressed by the prior art. In particular, there is a need in the art for an athletic training system that includes a device that can interact with an athlete by chasing, being chased, or other similar activities at speeds that are relevant to athletic activities. Furthermore, there is a need in the art for an athletic training system that includes provisions for analyzing the movements of the athlete, determining weaknesses in the athlete's movements, and automatically adapts its own motion to yield new training routines that stress the athlete's weaknesses.

SUMMARY OF THE INVENTION

An adaptive training system is disclosed. In one aspect, the invention provides a mobile unit configured to train an athlete, comprising: a set of ports on a control unit that receive information associated with an athlete; the control unit determines a path for the mobile unit based on the information associated with the athlete; a mobility system comprising at least one cable; and where the control unit moves the mobile unit by controlling a cable driver that controls the motion of the mobile unit.

In another aspect, the mobile unit includes an optical device configured to receive optical information associated with the athlete.

In another aspect, the mobile unit is disposed above a practice field configured to accommodate the athlete.

In another aspect, the mobile unit is suspended above a practice field configured to accommodate the athlete.

In another aspect, the mobile unit includes at least one device configured to transmit and receive information from a sensor system associated with the athlete.

In another aspect, the mobile unit determines the relative location of the athlete using information received from the sensor system.

In another aspect, the invention provides a mobile unit configured to train an athlete, comprising: a set of ports configured to receive information associated with an athlete; a control unit receiving a training program; the control unit being configured to adjust the motion of the mobile unit; and where the mobile unit is suspended above a practice field.

In another aspect, the mobile unit is suspended from a cable system.

In another aspect, the mobile unit is suspended from a system of tracks.

In another aspect, the mobile unit is suspended from a balloon.

In another aspect, the mobile unit is associated with a remote controlled helicopter.

In another aspect, the invention provides a mobile unit configured to train an athlete, comprising: a port that receive information associated with an athlete; a display unit associated with the mobile unit; the mobile unit being spaced from the athlete and suspended over a practice field configured to train the athlete; and wherein the information associated with the athlete is displayed on the display unit.

In another aspect, the information is displayed in real-time.

In another aspect, the display unit is associated with at least one speaker.

In another aspect, the information associated with the athlete is transmitted through the at least one speaker.

In another aspect, the display unit is a video screen associated with the practice field.

In another aspect, the invention includes a training system, comprising: a projection device configured to display a projected target; a control unit receiving a training path; and where the position of the projection target is adjusted by the control unit to stress the weakest athletic skill of the athlete.

In another aspect, the control unit includes an optical device configured to receive optical information associated with the athlete, and wherein the optical information is used to adjust the position of the projected target.

In another aspect, the control unit maintains a distance between the athlete and the projected target.

In another aspect, the control unit includes at least one device configured to transmit and receive information from a sensor system associated with the athlete.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
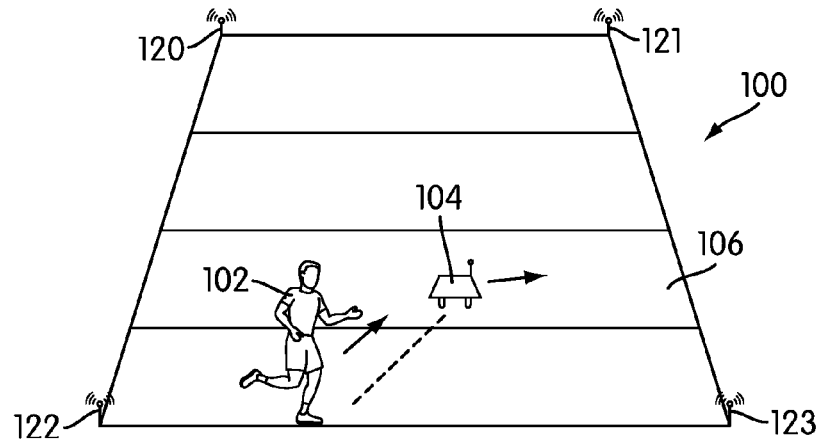
FIG. 1 is a schematic view of a preferred embodiment of a training system.
Figure 2:
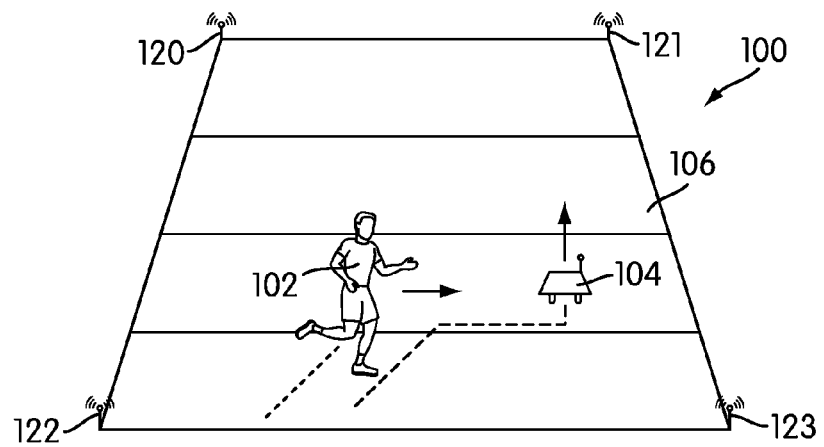
FIG. 2 is a schematic view of a preferred embodiment of a training system.

FIGS. 1-2 are a preferred embodiment of training system 100. Training system 100 preferably includes practice field 106. The term 'practice field', as used throughout this detailed description, refers to any type of field, court, or generally open space that may be used for training activities. Examples of practice fields include, but are not limited to, football fields, soccer pitches or fields, lacrosse fields, basketball courts, as well as other types of fields and/or courts. Additionally, any open space that may be used for training activities such as those described throughout this detailed description may also be considered practice fields. For the purposes of clarity, practice field 106 is shown here as a football field.

Preferably, training system 100 may also include athlete 102. The term athlete is intended to include both professional athletes and amateur athletes. Generally, athlete 102 may be any person wishing to take part in an athletic training activity. Therefore, the term athlete, as used throughout this detailed discussion and in the claims, refers to any user of training system 100.

Training system 100 also preferably includes mobile unit 104. The term 'mobile unit' refers to any mechanical device with mobile capabilities, intended for use with training system 100. In some embodiments, mobile unit 104 may be configured to move around practice field 106. In particular, it is preferable that mobile unit 104 may be configured to accomplish the task of running away from athlete 102 and/or chasing athlete 102. In some embodiments, mobile unit 104 may be a robot. In other embodiments, mobile unit 104 may be more similar to a small car, cart or similar vehicle.

In the current embodiment, mobile unit 104 is seen to have a simple shape and/or design. In some embodiments, mobile unit 104 may have an appearance that is similar to a remote controlled car or other vehicle. In some embodiments, mobile unit 104 may have a 'rover'-like appearance. It should be emphasized that the shape and design of mobile unit 104 shown in the Figures is only intended as an exemplary embodiment. Generally, mobile unit 104 may have any size, shape and/or design. For example, in another embodiment, mobile unit 104 may be human-like, including legs, arms, a head, as well as other human-like features. In still other embodiments, mobile unit 104 may be configured to look like an animal, such as animals associated with 'chasing', like rabbits, cats and other kinds of animals.

Figure 3:
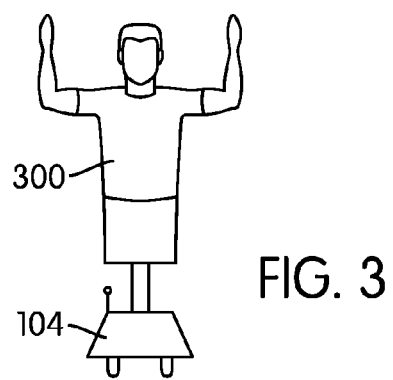
FIG. 3 is a front view of a preferred embodiment of a mobile unit.

In still other embodiments, mobile unit 104 may include provisions that mimic characteristics of a real athlete. For example, as seen in FIG. 3, in some embodiments mobile unit 104 may include dummy 300. Using dummy 300, athlete 102 may feel more natural attempting to chase or 'cover' mobile unit 104. In other embodiments, other decorative features may be applied to mobile unit 104.

Preferably, training system 100 includes provisions for training an athlete with respect to various athletic skills that are important for a strong performance in many sports. Examples of these athletic skills include, but are not limited to linear speed, lateral speed, left turning speed, right turning speed, starting acceleration, mid-stride acceleration, deceleration as well as other capabilities. For example, a running back in football must have good lateral speed in order to avoid tackles in addition to having good linear speed in order to move the ball down the field. Therefore, it may be important to have a training system available to the athlete that trains them with special emphasis placed on one or more of these athletic skills.

As seen in FIGS. 1 and 2, training system 100 is preferably configured so that athlete 102 chases mobile unit 104 on practice field 106. Preferably, during this chasing activity, mobile unit 104 is always moving in a way to avoid being caught by athlete 102. As mobile unit 104 constantly changes direction and/or speed, athlete 102 must adjust to the new direction and speed in an attempt to catch mobile unit 104. Preferably, mobile unit 104 moves in a way so that, as athlete 102 follows mobile unit 104, athlete 102 is moving linearly, laterally, accelerating and decelerating over the course of a training session.

Figure 4:
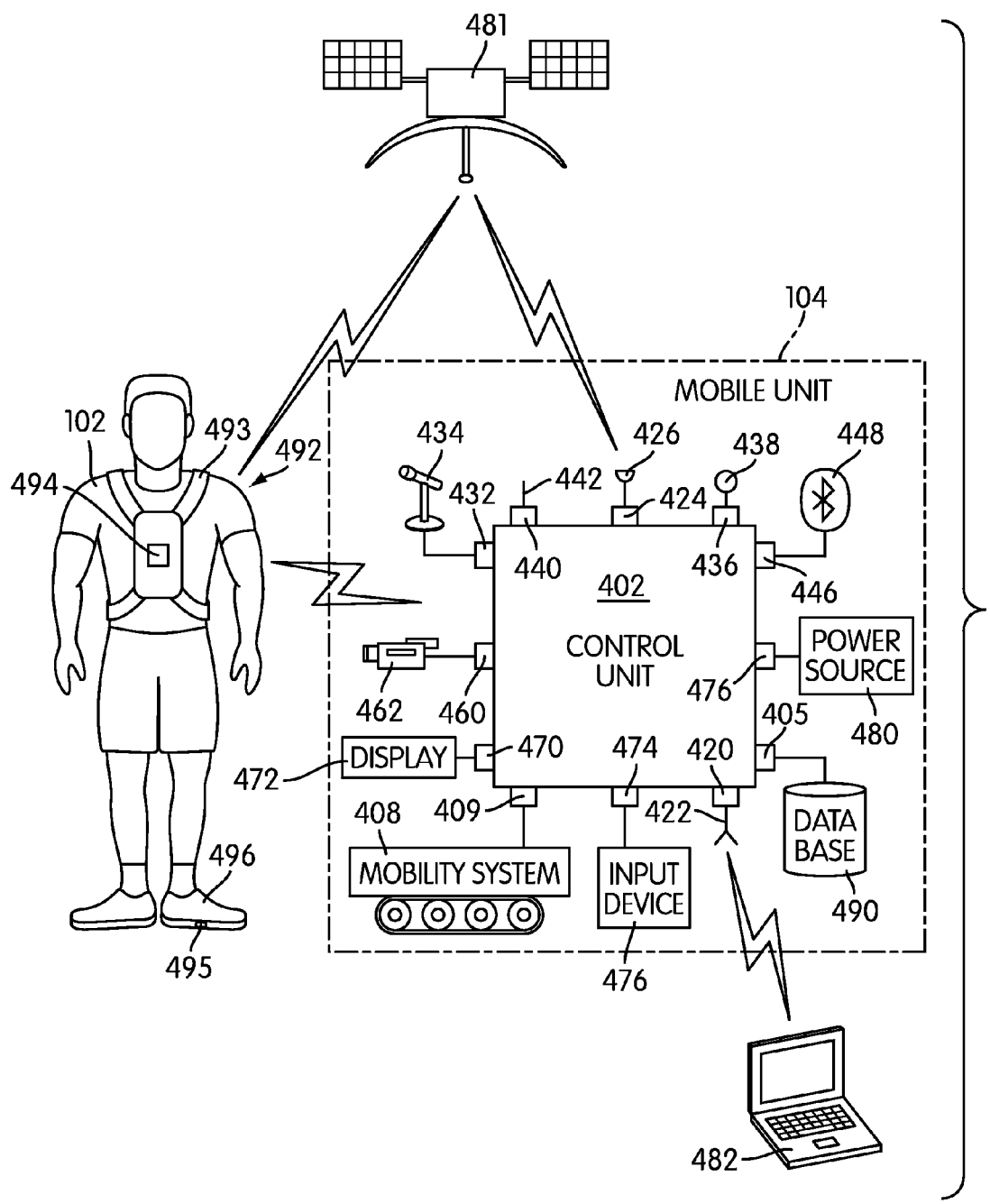
FIG. 4 is a schematic diagram of a preferred embodiment of a mobile unit.

FIG. 4 is a schematic diagram of several devices, resources and/or provisions that are associated with mobile unit 104 and athlete 102. Preferably, mobile unit 104 may include control unit 402. Control unit 402 may include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with control unit 402 are optional. Some embodiments may include a given port or provision, while others may exclude it. The following description discloses many of the possible parts and provisions that can be used, however, it should be kept in mind that not every part or provision must be used or included in a given embodiment.

Preferably, control unit 402 includes provisions for communicating with athlete 102 and/or remote computer 482. Control unit 402 can include wireless network antenna port 420 that is designed to transmit and/or receive information from wireless network antenna 422 and GPS antenna port 424 designed to transmit and/or receive information from GPS antenna 426. Control unit 402 can also include RFID port 440 that is designed to transmit and/or receive information from RFID antenna 442.

Control unit 402 can also include provisions to communicate with a wireless telephone, or other devices using various electronic protocols. Any system can be used to facilitate this communication with wireless devices; however, a low power radio frequency system is preferred. In an exemplary embodiment, a wireless local or personal area network using the Bluetooth protocol is used to facilitate communication with a wireless telephone, computer, or other electronic device with Bluetooth capabilities. In the exemplary embodiment shown in FIG. 4, control unit 402 includes a local wireless network antenna port 446 that is designed to communicate with a local wireless network antenna 448, which in turn, is designed to communicate wirelessly with any wireless device.

Control unit 402 can also include a number of items that facilitate human interaction with mobile unit 104. To receive vocal information from a user, control unit 402 can include a microphone port 432 that is capable of communicating with a microphone 434. Control unit 402 can also include an audio port 436 that is designed to send audio information to one or more speakers 438 or audio devices. These audio devices can include preamplifiers, amplifiers and/or crossovers. In some embodiments, microphone port 432 and audio port 436 are conductors associated with a single physical connector. For example, microphone port 432 and audio port 436 can be female conductors of a multi-channel coaxial plug, like a standard 2.5 mm headset plug.

Preferably, control unit 402 may be associated with various optical sensors that may be configured to monitor the location or trajectory of athlete 102. These various optical sensors may also be used to help determine the location of mobile unit 104 on practice field 106, as well as avoid obstacles and monitor general conditions of the environment. Control unit 402 can include optical port 460 that is designed to communicate with optical device 462. In some embodiments, optical device 462 may be one or more video cameras associated with various sides of mobile unit 104. For example, mobile unit 104 may include a video camera for rearward viewing that may be especially useful in tracking athlete 102 as athlete 102 chases behind mobile unit 104. Mobile until 104 may also include additional video cameras along a front side, as well as along the left and right side, and even a downward looking camera, all designed to give mobile unit 104 full view of athlete 102, the environment, and also to enable mobile unit 104 to avoid any obstacles on practice field 106. In other embodiments, optical device 462 may be an infrared camera configured to sense heat sources such as athlete 102. This infrared configuration may be useful in dark conditions such as at night.

In some embodiments, control unit 402 may include provisions such as an interactive panel that may facilitate in programming, or accessing information from, mobile unit 104. Control unit 402 may be associated with display panel port 470, designed to communicate with display device 472. To receive input from a user, control unit 402 can include an input port 474. Input port 474 can communicate with input device 476. In some embodiments, display device 472 can also receive input from a user. In some embodiments, display device 472 includes a touch screen that can receive input and in other embodiments, display device 472 includes a number of buttons that can receive input. In some embodiments, display device 472 includes both a touch screen and buttons.

A power port 476 can connect control unit 402 to power supply 480. Examples of specific types of power supplies that may be used with mobile unit 104 include, but are not limited to, standard batteries, rechargeable batteries, engines, photochemical power sources, hybrid power sources and other types of power sources. In other embodiments, power supply 480 may be a remote power source connected to mobile unit 104 using a wire or similar electrical conductor. Generally, the type of power source used will vary.

Mobile unit 104 can also include data storage provisions including one or more databases or similar data storage devices. Preferably, control unit 402 is in communication with at least one database 490 via database port 405. Database 490 can be any kind of data storage device, including but not limited magnetic, optical, magneto-optical, and/or memory, including volatile memory and non-volatile memory. In some embodiments, database 490 is integral with control unit 402 and in other embodiments, database 490 is separate from control unit 402 and communicates with control unit 402. In some embodiments, for example, database 490 may be located outside of mobile unit, and accessed remotely via any known wired or wireless methods.

In some embodiments, all or most of the items shown in FIG. 4 are housed in a single case or unit. In other embodiments, the various items shown in FIG. 4 are not housed at a single physical location, but instead, are distributed throughout mobile unit 104 and communicate with one another via known wired or wireless methods. In general, any of the items shown here may be physically located outside of mobile unit 104, and remotely access via any of the communication methods discussed here for information transfer.

Mobile unit 104 may include provisions for moving. Preferably, mobile unit 104 includes mobility system 408. Mobility system 408 may be in communication with control unit 402 via mobility system port 409. In this embodiment, mobility system 408 is a set of wheels. However, in other embodiments, mobility system 408 may be a mechanism other than wheels. For example, robots with legs that can move around have previously been disclosed. The reader is referred to U.S. Pat. Nos. 7,142,946; 7,076,338; 7,072,740; 7,061,200; 7,054,718; 7,053,577; and 7,031,806, for more information, the entirety of which are incorporated here by reference. In some embodiments, mobility system 408 may include two, three, four, or more legs. Additionally, mobility system 408 may comprise a set of tracks similar to those found in many tanks.

Preferably, mobile unit 104 has the ability to attain speeds associated with high performance athletes. Because mobile unit 104 is intended to mimic motions of various athletes including a wide receiver, for example, realistic training of athlete 102 by mobile unit 104 can only be accomplished if mobile unit 104 is able to move with the same speed as a typical, or even elite, wide receiver. Generally, the fastest a human can run is in the range of 10-12 meters per second, and this is generally for very short periods of time. Although it is unlikely that an average wide receiver or other athletes will run at these speeds, especially for any extended period of time, the value of 13 meters per second may serve as an upper bound on the range of speeds which mobile unit 104 may be expected to achieve. In other words, it is preferable that mobility system 408 include provisions for propelling mobile unit 104 at any speed between 0 and 13 meters per second.

Training system 100 may also include provisions for monitoring athlete 102 during a training session. Preferably, this monitoring is performed by mobile unit 104. In some embodiments, athlete 102 may be associated with sensor system 492 designed to transmit and/or receive information between athlete 102 and mobile unit 104. In this embodiment, sensor system 492 includes sensor harness 493, including front sensor 494. Sensor system 492 also includes footwear sensor 495 that may be disposed within any part of article of footwear 496.

Front sensor 494 and footwear sensor 495 may be configured to transmit and/or receive information related to GPS data as well as RFID data. For example, sensors 494 and 495 may be configured to receive GPS information regarding the location of athlete 102 from GPS system 481 and then transmit this information to mobile unit 104. In another example, practice field 106 may include a network of RFID tags configured to transmit location related information. As athlete 102 moves through the network of RFID tags, sensors 494 and 495 may receive this location information and transmit it to mobile unit 104.

Additionally, front sensor 494 and footwear sensor 495 may be configured to transmit any signal that may be received by mobile unit 104 using one of the various receiving devices previously discussed. In some cases, by transmitting a simple signal at any desired frequency, mobile unit 104 may use this transmitted information to determine the location of athlete 102 on practice field 106. In some cases, optical information received by optical device 462 may be used in conjunction with a simple transmission signal to more accurately determine the location of athlete 102.

The configuration of sensor system 492 shown in this embodiment is only intended to illustrate the various types and locations of sensors that may be associated with athlete 102. In other embodiments, more than two sensors may be used, or only a single sensor may be used. Additionally, the location of sensors comprising sensor system 492 may vary from the preferred embodiment.

Mobile unit 104 may also be associated with computer 482. The term 'computer' refers to any device including a central processing unit, some kind of memory, a user interface and mechanisms for input/output. Computer 482 can be a portable computer, for example, a laptop, notebook or Personal Data Assistant (PDA). Computer 482 can include a database, generally residing in a mass storage device like a hard disk drive or an optical storage device. The term "computer" refers to the computing resources of a single computer, a portion of the computing resources of a single computer, and/or two or more computers in communication with one another, also any of these resources can be operated by one or more human users. In an exemplary embodiment, computer 482 includes a personal computer.

In some embodiments, mobile unit 104 may communicate with computer 482 via a wireless network, including but not limited to any broadband wireless access network or a high bandwidth packet switched network using, for example, any one of the following standards: IEEE 802.11a, IEEE 802.11b, and/or IEEE 802.11g, commonly referred to as WiFi, IEEE 802.16a, referred to as WiMAX. Computer 482 and mobile unit 104 may also communicate via the Bluetooth protocol.

Preferably, computer 482 may assist control unit 402 in processing and/or storing information gathered by mobile unit 104. In some embodiments, computer 482 may be used as an interface to program mobile unit 104 as well as receive information from mobile unit 104 regarding the performance of athlete 102.

Figure 5:
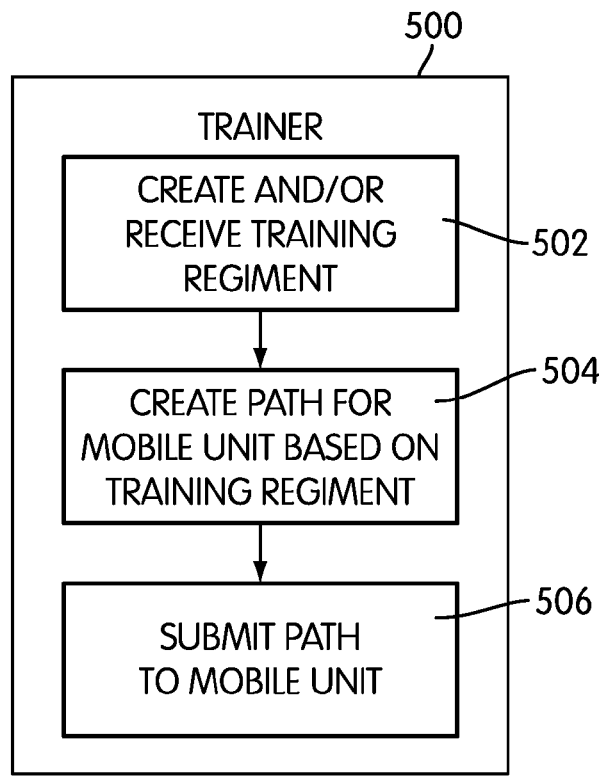
FIG. 5 is a flow chart of a preferred embodiment of a method associated with a trainer.

In some embodiments, mobile unit 104 may be programmed to follow a particular path for training athlete 102, as designated by a trainer or coach. FIG. 5 is a flow diagram of a preferred system and method for creating a training path. The following steps are preferably implemented by a coach or trainer that has knowledge of the training needs of athlete 102. However, in other embodiments, these steps may be implemented by athlete 102 or anyone else.

During a first step 502, trainer 500 preferably creates and/or receives a training regiment for athlete 102. In some embodiments, trainer 500 may design a training regiment using general knowledge of athlete 102 as well as other information. In other embodiments, trainer 500 may receive a training regiment from an outside source, such as a book, the internet or another trainer. Preferably, trainer 500 then proceeds to create a path for mobile unit 104 that is based on the training regiment, during a second step 504. For example, if the training regiment is a set of sprinting exercises and a set of lateral running exercises, trainer 500 may create a path for mobile unit 104 that incorporates long linear paths and several lateral paths.

Figure 6:
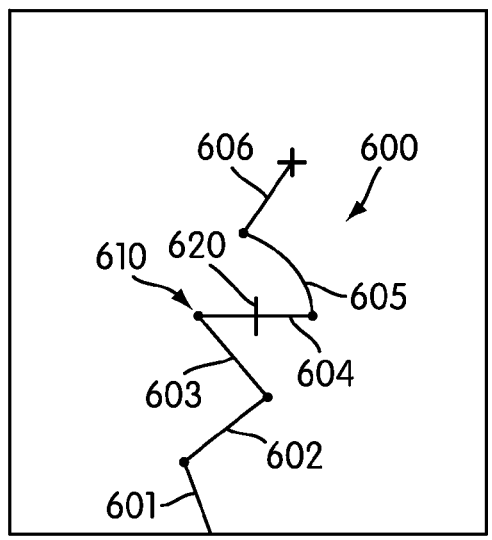
FIG. 6 is a schematic view of a preferred embodiment of a training path.

In another example, shown in FIG. 6, trainer 500 has created path 600 to include first linear portions 601, second linear portion 602, third linear portion 603, lateral portion 604, as well as banking portion 605 and fourth linear portion 606. Additionally, path 600 is configured to include several sharp turns 610. Using this training configuration, athlete 102 may be trained in linear speed as well as bank speed and turning speed.

In some embodiments, path 600 may be created using a simple graphical program that is preferably configured to run on computer 482 and be transmitted to mobile unit 104. In other embodiments, trainer 500 may designate path 600 using display device 472 and/or input device 476 of mobile unit 104. During a third, and final, step 506, trainer 500 may submit path 600 to mobile unit 104. In some embodiments this may be achieved by using computer 482 to submit path 600 to mobile unit 104. In cases where trainer 500 is designing path 600 using display device 472 and/or input device 476 of mobile unit 104, trainer 500 may press a 'submit' button to finalize the design.

It should be understood that FIG. 6 represents a possible embodiment of path 600 as created by trainer 500. In some embodiments, path 600 may be submitted to mobile unit 104 with additional information. For example, information regarding field boundaries, intermediate markers, preferred speeds, as well as other preferences associated with the envisioned training route may be submitted. For example, in some embodiments, trainer 500 may submit additional instructions that mobile unit 104 should pause for 5 seconds at halfway mark 620. This command may facilitate training athlete 102 in acceleration and deceleration. Preferably, mobile unit 104 is configured to receive additional types of information.

Figure 7:
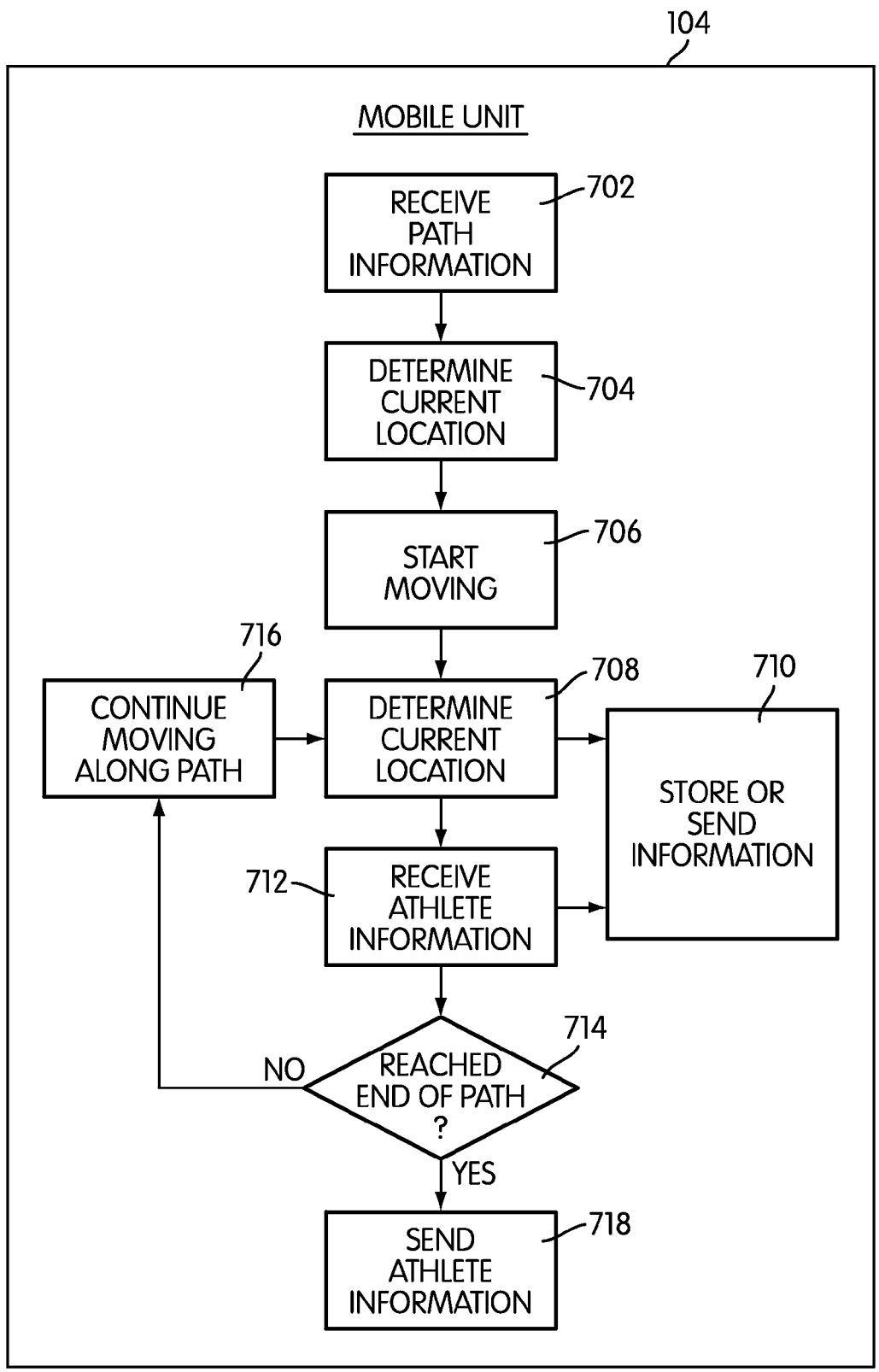
FIG. 7 is a flow chart of a preferred embodiment of a method associated with a mobile unit.

FIG. 7 is a flow diagram of a preferred embodiment of the processes associated with mobile unit 104, once a training session has started. Preferably, mobile unit 104 receives path information during step 702, after it has been submitted to mobile unit 104 by trainer 500. It should be understood that in other embodiments, path information could come from elsewhere besides trainer 500. In some embodiments, a predefined path could be selected by mobile unit 104, either randomly or on the basis of some input received at input device 476. For example, mobile unit 104 could be preprogrammed by a manufacturer with multiple training paths that are configured to be used on fields of various sizes.

Next, the current location of mobile unit 104 may be determined during step 704. This information may be received by GPS, preprogrammed coordinates, or using another method. In some embodiments, the current location of mobile system 104 may be stored in database 490 during step 704.

Once mobile unit 104 has received the path information and determined a current location, it may start moving during step 706. In some embodiments, mobile unit 104 may wait to start moving until it has received a 'start' command from athlete 102 or trainer 500. This 'start' command could be implemented using a vocal command that would be received by microphone 434, for example. In other embodiments, trainer 500 may transmit a 'start' command from computer 482 or even a separate remote of some kind.

As mobile unit 104 moves, its current location is determined during step 708. The location of mobile unit 104 may be determined using various methods. In some embodiments, the absolute location of mobile unit 104 may be determined using a GPS system, when mobile unit 104 includes GPS capabilities. In other embodiments, the location of mobile unit 104 with respect to practice field 106 may be determined using various methods, including, as previously discussed, a network of RFID tags associated with practice field 106, which may transmit location information signals that may be received by mobile unit 104. Additionally, the relative location of mobile unit 104 with respect to a starting point may be inferred by keeping track of how far it has traveled as well as any turns it has taken. Preferably, the location of mobile unit 104 is stored in database 490 during step 710. In other embodiments, mobile unit 104 may send the location information to computer 482 or to another device such as a remote database during step 710.

Presumably, athlete 102 may chase mobile unit 104 once mobile unit 104 is moving, as seen in FIGS. 1 and 2. During step 712, mobile unit 104 may receive various information about athlete 102, especially with respect to the location and/or speed of athlete 102, as previously discussed in reference to sensor system 492. Information regarding the location of athlete 102 is preferably stored in a similar manner to the information regarding the location of mobile unit 104, during step 710.

In some embodiments, additional information associated with athlete 102 may be received and/or stored. For example, an athlete's current speed, trajectory or other information may also be determined and stored. In a preferred embodiment, only the location of athlete 102, and the time the information is received may be necessary. From this location and time information, speeds, accelerations and other information may be later calculated and analyzed.

After step 712, mobile unit 104 preferably determines if it has completed the training path during step 714. If not, it continues moving along the training path during step 716, and proceeds to step 708 once again. Generally, this sequence of determining the locations of mobile unit 104 and athlete 102, as well as storing the location and/or other information, progresses very rapidly. In some embodiments, mobile unit 104 may cycle through steps 708, 710, 712, 714 and 716 hundreds or even thousands of times a second. In this sense, athlete 102 and mobile unit 104 may function as a telemetry system that is rapidly transmitting and receiving information in an attempt to precisely and accurately measure and record an athlete's motion during a training session.

When mobile unit 104 has finally completed the training path, it will preferably proceed from step 714 to step 718, where it may send all the information that it has gathered during the training session to computer 482. In other embodiments, the information may be viewed using display device 472 of mobile unit 104. This compiled information may be used by a trainer or coach to study the performance of athlete 102 and perhaps make adjustments to the training regiment.

Figure 8:
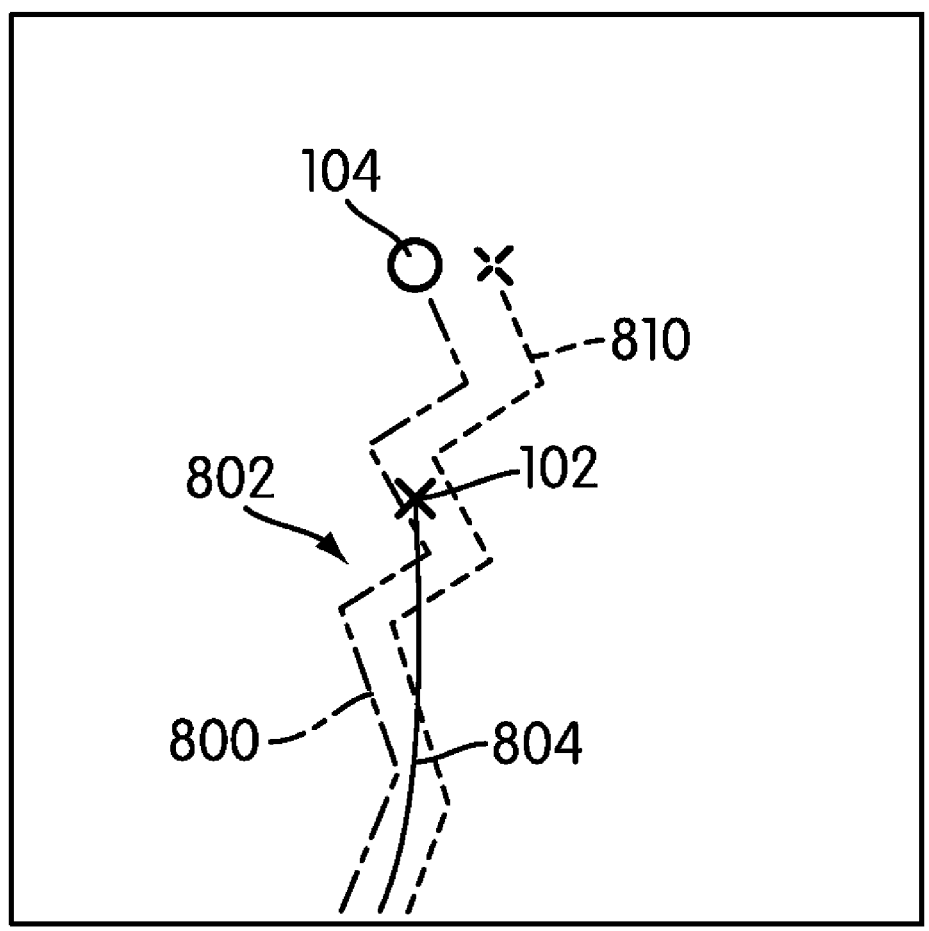
FIG. 8 is a schematic view of a preferred embodiment of a training path.

In an alternative embodiment, mobile unit 104 may include provisions for automatically adjusting its speed along a path. FIG. 8 is an example of a training session where mobile unit 104 is so far ahead of athlete 102 that athlete 102 is running along straight path segment 804 to catch up, rather than performing lateral movements and turns along diagonal path segment 802 of path 800.

Figure 9:
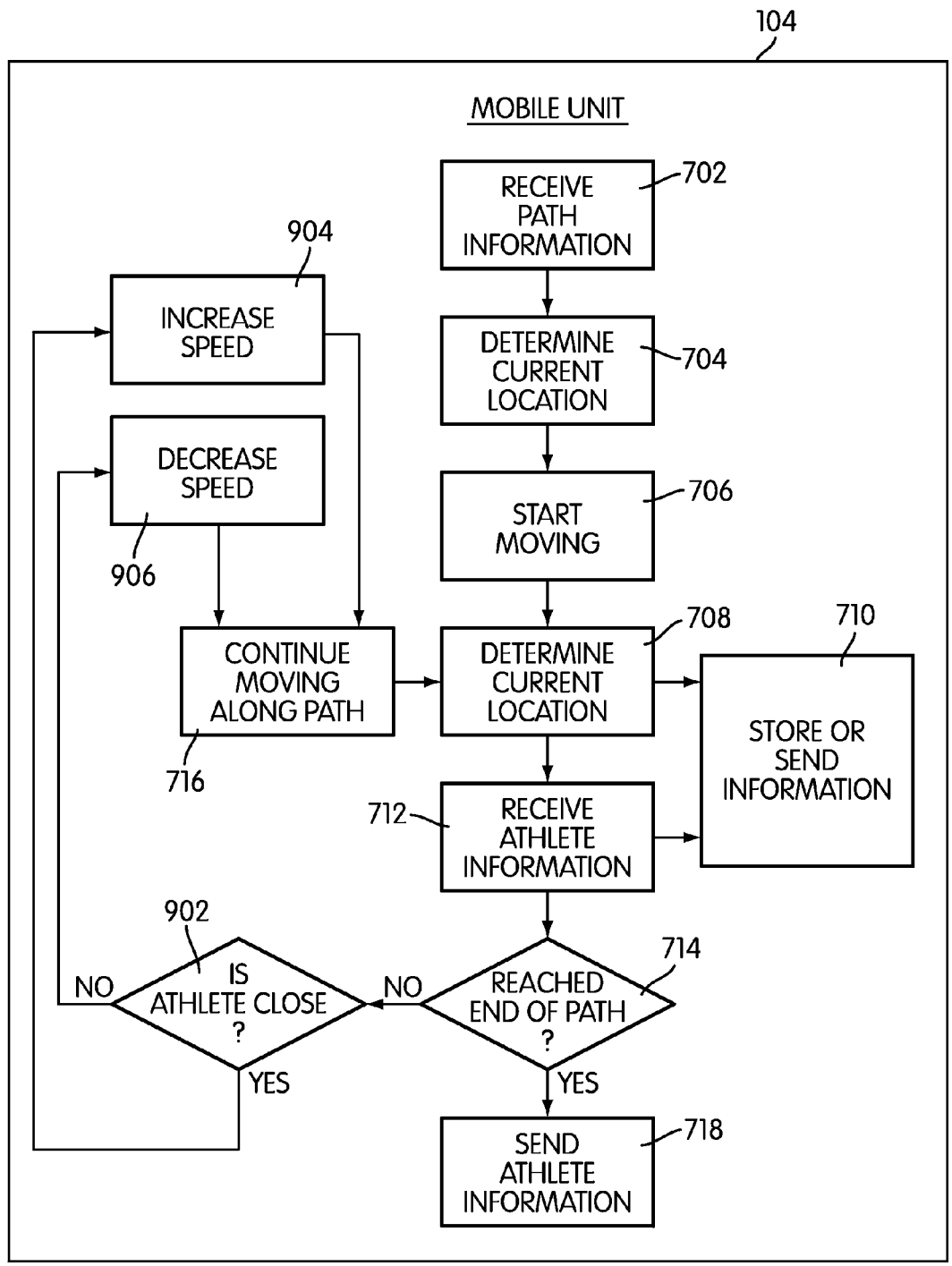
FIG. 9 is a flow chart of a preferred embodiment of a method associated with a mobile unit.

FIG. 9 is a flow chart of an alternative embodiment of a process or method associated with mobile unit 104, where mobile unit 104 may automatically adjust its speed depending on the distance between athlete 102 and mobile unit 104. Generally, mobile unit 104 proceeds, as discussed in the previous embodiment, through steps 702, 704, 706, 708, 710 and 712 until step 714. At this point, if mobile unit 104 has not reached the end of the training path, mobile unit 104 may proceed to step 902. During step 902, mobile unit 104 may evaluate its distance from athlete 102. If the athlete is close, mobile unit 104 may proceed to step 904, where mobile unit 104 increases its speed in order to keep from being caught by athlete 102. The term 'close' here may refer to a predefined distance. Otherwise, mobile unit 104 may proceed to step 906. During step 906, mobile unit 104 decreases its speed to prevent athlete 102 from lagging too far behind. After either step 904 or 906, mobile unit 104 may proceed to step 716 and then to step 708. As with the previous embodiment, mobile unit 104 may cycle through steps 708, 710, 712, 714, 902, 904, 906 and 716 until the end of the training path is reached. Generally, this sequence of determining the locations of mobile unit 104 and athlete 102, as well as storing the location and/or information, progresses very rapidly, as previously discussed.

When mobile unit 104 has finally completed the training path, it will preferably proceed from step 714 to step 718, where it may send all the information that it has gathered during the training session to computer 482. In other embodiments, the information may be viewed using display device 472 of mobile unit 104.

Referring back to FIG. 8, path 810 represents the path taken by athlete 102 when mobile unit 104 has slowed down enough to keep athlete 102 close behind. Path 810 is preferably similar to path 800, which may facilitate in training athlete 102 in sharp turning.

Figure 10:
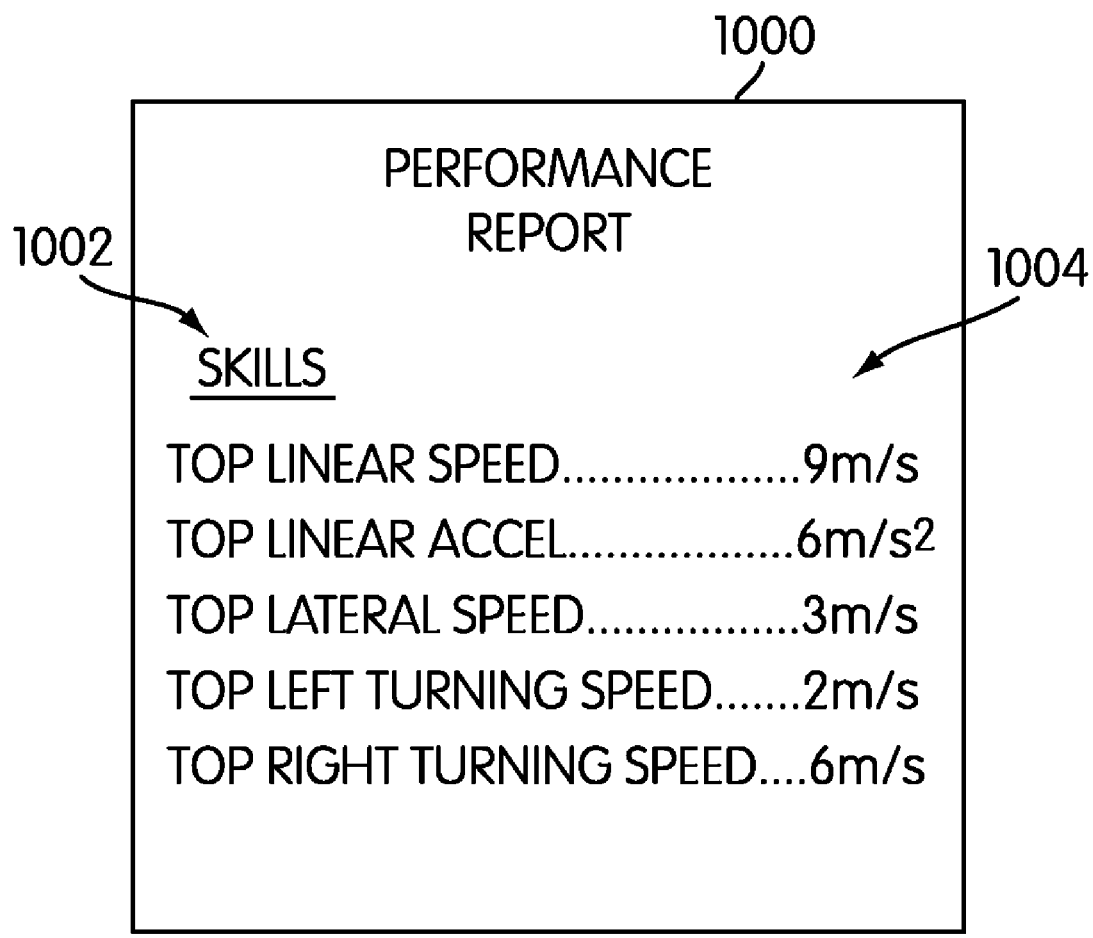
FIG. 10 is a preferred embodiment of a performance report.

FIG. 10 is a preferred embodiment of performance report 1000 that may be compiled using information gathered by mobile unit 104 during the training session. Report 1000 may be processed by trainer 500 using computer 482, or in some embodiments, report 1000 may be processed directly by mobile unit 104. Report 1000 includes several athletic skills under column 1002 that may be evaluated via the training session with mobile unit 104. Examples of athletic skills seen in this embodiment include: top linear speed, top linear acceleration, top lateral speed, top left turning speed, top right turning speed as well as other athletic skills. The reported values, shown in column 1004, allow trainer 500 to evaluate athlete 102 with respect to various athletic skills.

In some embodiments, mobile unit 104 may include provisions for dynamically choosing a training path. In other words, mobile unit 104 may select its own training path that depends on dynamic conditions such as the current location of athlete 102 and/or boundaries of practice field 106. For example, in some cases, mobile unit 104 may randomly generate a training path that begins at its current location along practice field 106. Before mobile unit 104 proceeds, it may be important to determine if executing the currently selected training path would lead if off of practice field 106. Just as a real football player would know to stay in bounds during a game, mobile unit 104 must be able to execute self selected training paths without going out of bounds in order to realistically train athlete 102.

Figure 11:
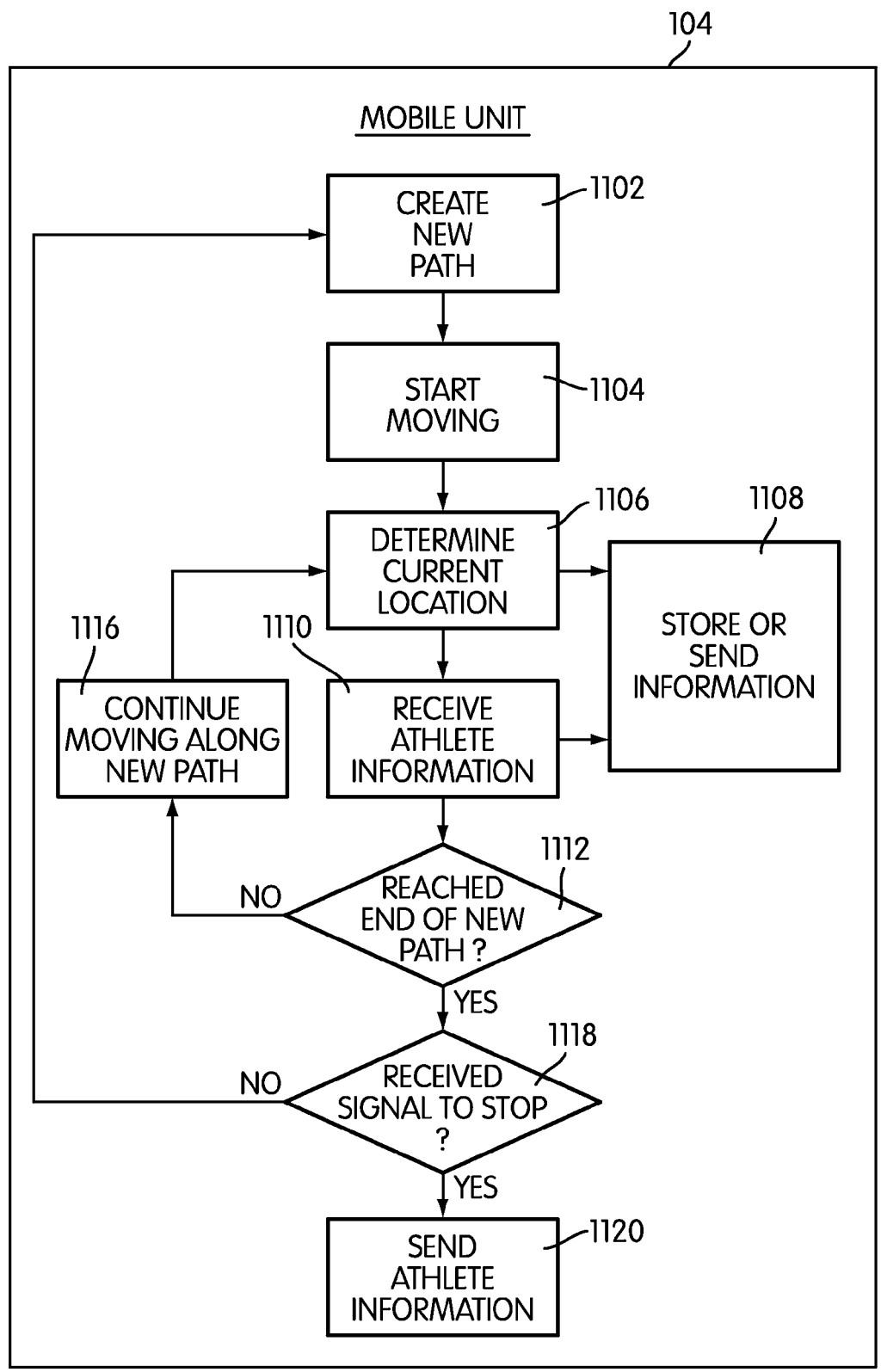
FIG. 11 is a flow chart of a preferred embodiment of a method associated with a mobile unit.
Figure 12:
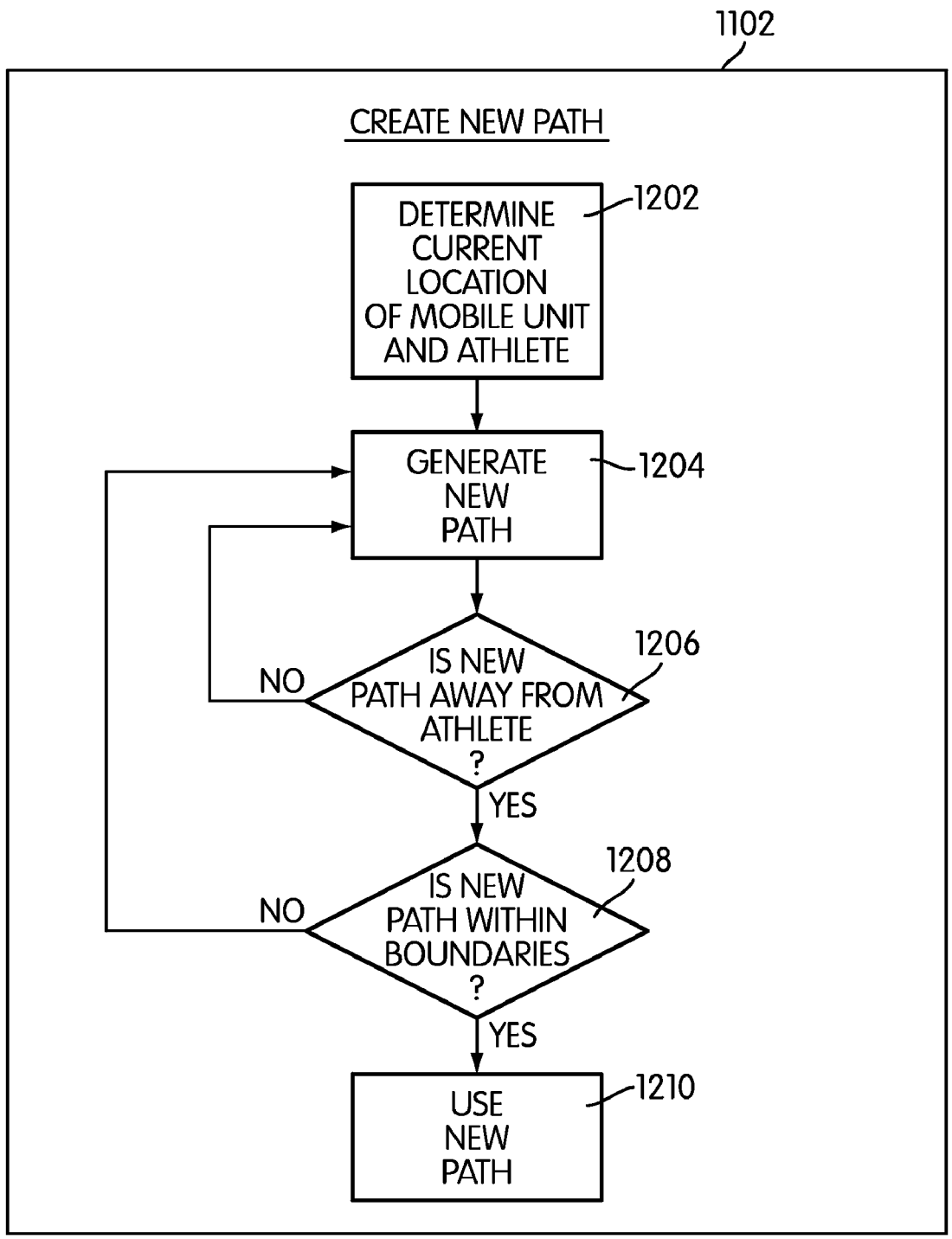
FIG. 12 is a flow char of a preferred embodiment of a method associated with a mobile unit.

FIG. 11 is a flow diagram of a preferred embodiment of a method or process used by mobile unit 104 to choose and execute a training path on the basis of dynamic conditions such as athlete location and boundary locations. During step 1102, mobile unit 104 preferably creates a new training path. Referring to FIG. 12, step 1102 of selecting a new training path may be further broken down into sub-steps. Beginning with sub-step 1202 of step 1102, mobile unit 104 may determine its own location and the location of athlete 102 using any of the methods previously discussed. Following this, during sub-step 1204, mobile unit 104 may generate a new training path. This new training path may be generated using any process, including processes that generate substantially random training paths.

Figure 13:
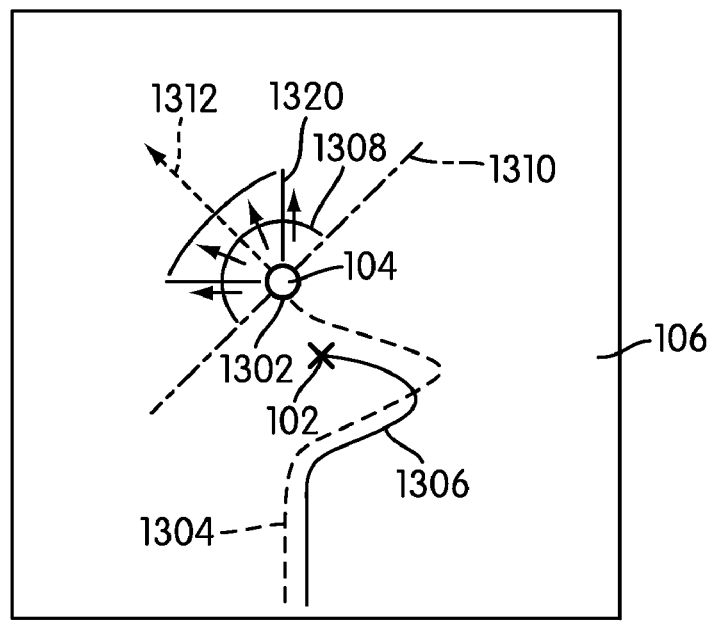
FIG. 13 is a schematic view of a preferred embodiment of a training path.

At this point, the training path must be further analyzed to determine if the path is permitted by a predetermined set of dynamic conditions. Two such dynamic conditions have been previously discussed. One condition, illustrated in FIG. 13, is that mobile unit 104 should always move in a direction that is 'away from' athlete 102. Because mobile unit 104 is training athlete 102 to chase, it would be an undesirable consequence for mobile unit 104 to execute a training path that leads directly back to athlete 102. Therefore, in some embodiments, the first dynamic condition may be a rule that requires mobile unit 104 to choose a new training path that has a first trajectory aimed away from athlete 102.

Following sub-step 1204, mobile unit 104 proceeds to sub-step 1206 of determining if the direction of the new path is away from the athlete. If the new training path meets this dynamic condition of being directed away from athlete 102, mobile unit 104 may proceed to sub-step 1208, otherwise mobile unit 104 proceeds back to sub-step 1204, where a new training path is generated. Generally, mobile unit 104 may loop through steps 1204 and 1206 until it selects a path that meets the required condition of moving away from athlete 102.

In FIG. 13, mobile unit 104 is disposed at end point 1302 of first training path 1304, with athlete 102 close behind moving along second path 1306. In order to move away from athlete 102, mobile unit 104 will preferably only consider a new training path directed along a 180 degree arc 1308 from first axis 1310. In this embodiment, first axis 1310 is perpendicular to second axis 1312 that is directed away from athlete 102. In other words, mobile unit 104 may only consider moving in directions in front of first axis 1310 and may not consider moving in directions behind first axis 1310. Alternatively, mobile unit 104 could also be programmed to consider only new training paths with first trajectories along 90 degree arc 1320 as well as any other arc of directions.

Once mobile unit 104 has proceeded to sub-step 1208, it may check to see if executing the currently generated training path would move mobile unit 104 out of the boundaries associated with practice field 106. Mobile unit 104 may determine the location of predefined boundaries using various methods. In one embodiment, the boundaries of practice field 106 may be defined using first boundary marker 120, second boundary marker 121, third boundary marker 122 and fourth boundary marker 123, as seen in FIGS. 1 and 2. These boundary markers may transmit radio signals or other types of signals that communicate with mobile unit 104. In other embodiments, mobile unit 104 may include a predefined map of practice field 106. Therefore, knowing the current location of mobile unit 104 on practice field 106 allows mobile unit 104 to determine the relative locations of the boundaries.

In cases where the currently generated path crosses over one or more boundaries of practice field 106, it may proceed to back sub-step 1204 of generating a new training path. Thus, steps 1204, 1206 and 1208 may proceed until a new training path has been selected that meets the necessary dynamic conditions. If the currently generated training path does not cross over the boundaries of practice field 106, mobile unit 104 may proceed to a final sub-step 1210, where the currently generated path may be selected for execution by mobile unit 104.

Figure 14:
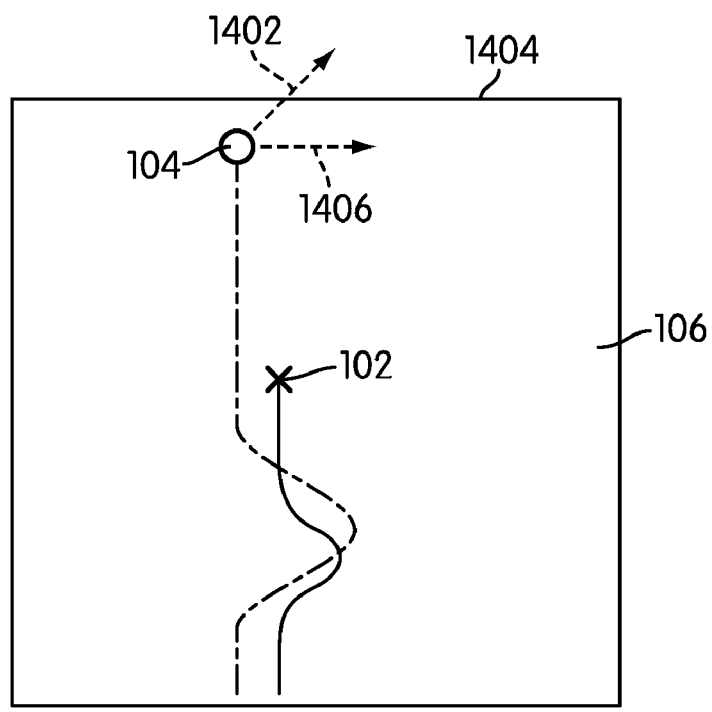
FIG. 14 is a schematic view of a preferred embodiment of a training path.

FIG. 14 illustrates a case where mobile unit 104 must select between two possible training paths on the basis of boundary conditions. In this embodiment, first path 1402 is directed across field boundary 1404, while second path 1406 is disposed entirely within practice field 106 and does not cross field boundary 1404. Therefore, in this embodiment, mobile unit 104 must select second path 1406 in order to avoid crossing field boundary 1404.

The consideration of boundaries and that requirement that mobile unit 104 should always move away from athlete 102 are only meant to be exemplary conditions for selecting training paths. In other embodiments, other conditions may be used to determine the subsequent paths taken by mobile unit 104 during a practice session. In some embodiments, boundaries may be ignored, and mobile unit 104 may move in any direction.

Referring back to FIG. 11, once mobile unit 104 has created and selected a new training path during step 1102, mobile unit 104 may then proceed to execute this new training path and start moving during step 1104. If the training session has just started, mobile unit 104 may wait to start moving until it has received a 'start' command from athlete 102 or trainer 500. This 'start' command could be implemented using a vocal command that would be received by microphone 434.

In other embodiments, trainer 500 may transmit a 'start' command from computer 482 or even a separate remote of some kind.

As mobile unit 104 moves, its current location is determined during step 1106. The location of mobile unit 104 may be determined using any of the previously described methods. Preferably, the location of mobile unit 104 may stored in database 490 during step 1108. In other embodiments, mobile unit 104 may send the location information to computer 482 or to another device such as a remote database.

Presumably, athlete 102 may chase mobile unit 104 once mobile unit 104 is moving, as seen in FIGS. 1 and 2. During step 1110, mobile unit 104 may receive various information about athlete 102, especially with respect to the location and/or speed of athlete 102, as previously discussed in reference to sensor system 492. Information regarding the location of athlete 102 is preferably stored in a similar manner to the information regarding the location of mobile unit 104, during step 1108.

In some embodiments, additional information associated with athlete 102 may be received and/or stored. For example, an athlete's current speed, trajectory or other information may also be determined and stored. In a preferred embodiment, only the location of athlete 102, and the time the information was received may be necessary. From this location and time information, speeds, accelerations and other information may be later calculated and analyzed.

Following step 1110, mobile unit 104 may proceed to step 1112. At this point, mobile unit 104 may determine if it has reached the end of the new training path. If mobile unit 104 has not reached the end of the new training path, it may proceed to step 1116 and continue moving along the new training path. As with the previous embodiments, mobile unit 104 may proceed through a rapid cycle of steps 1106, 1108, 1110, 1112 and 1116 until it reaches the end of the new training path. Additionally, in some embodiments, mobile unit 104 may adjust its speed depending on how far mobile unit 104 is from athlete 102. This may be achieved by methods or processes discussed in previous embodiments.

When mobile unit 104 has reached the end of the new training path, during step 1112, it may proceed to step 1118. During step 1118, mobile unit determines if a control signal has been sent to stop the training session. This control signal may be sent by athlete 102, trainer 500 or anyone else. Furthermore, this control signal may be an electronic signal, a vocal signal or any other kind of signal. If a control signal has not been received, mobile unit 104 will proceed to step 1102 where it will choose a new training path on the basis of dynamic conditions, as previously discussed. Mobile unit 104 may then cycle through steps 1104, 1106, 1108, 1110, 1112, 1116 and 1118 indefinitely. Generally, this process continues until a control signal has been received to stop the training session at step 1118. At this point, mobile unit 104 may proceed to step 1120 and send information about athlete 102 to computer 482. In some embodiments, a performance report may be generated, during or after step 1120, that is similar to performance report 1000 of FIG. 10.

In some embodiments, mobile unit 104 may include provisions for adapting its movement based on more complicated dynamic conditions such as the athlete's overall performance. In some embodiments, mobile unit 104 may 'learn' an athlete's strengths and/or weaknesses and adjust the current training path to stress various athletic skills such as linear speed, left/right turning speed, linear acceleration and other similar athletic skills. The term 'learn' refers to general computational processes associated with pattern recognition, as well as other processes associated with known algorithms used in the field of machine learning. Generally, any type of learning algorithms may be used, including algorithms associated with the following types of learning: supervised learning, unsupervised learning, semi-supervised learning, reinforcement learning, transduction and learning to learn algorithms.

Figure 15:
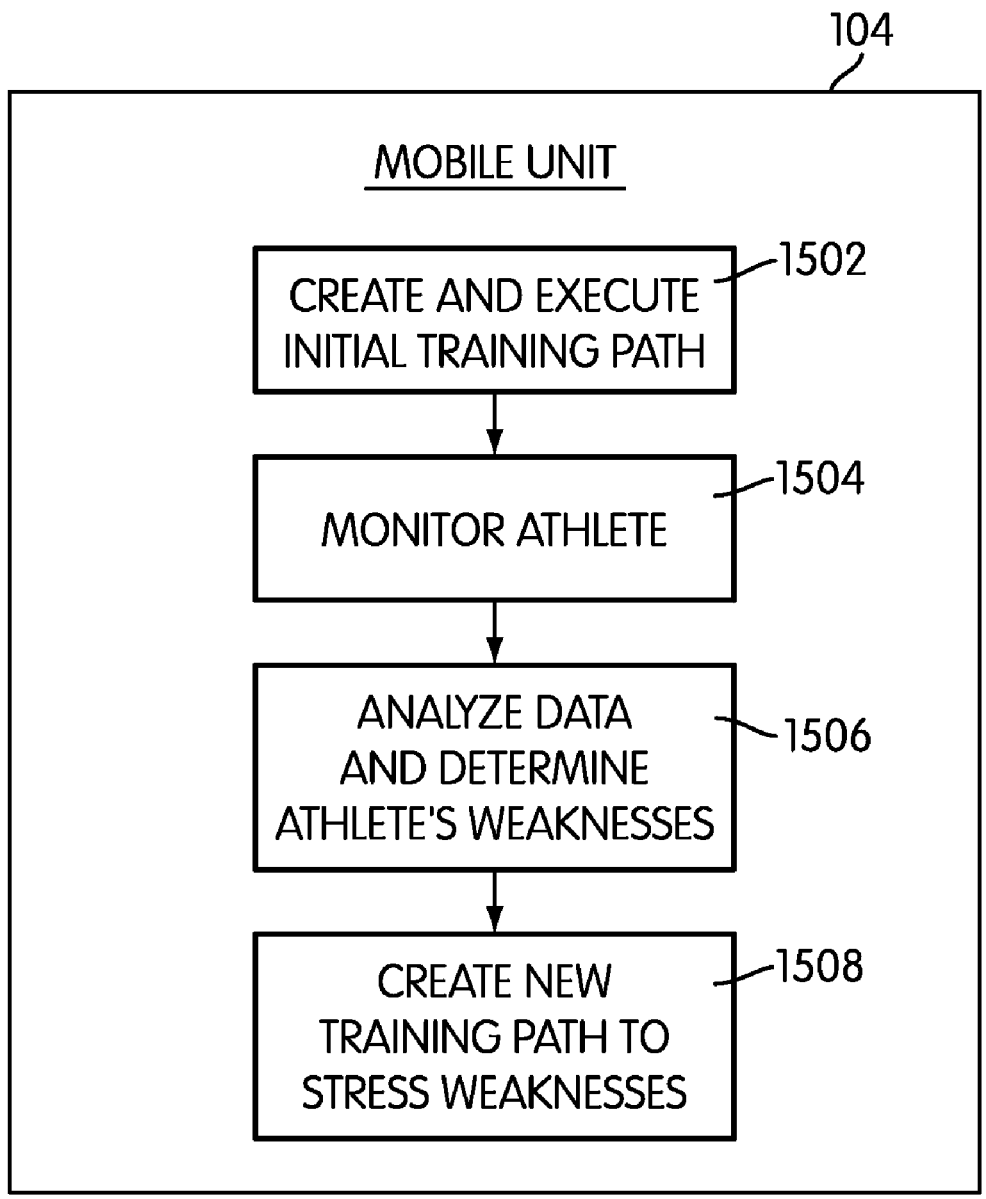
FIG. 15 is a flow chart of a preferred embodiment of a method associated with a mobile unit.

FIG. 15 is a flow chart of a preferred embodiment of a method or process associated with mobile unit 104. During a first step 1502, mobile unit 104 preferably creates and executes an initial training path. Step 1502 may be performed according to any of the processes or methods previously discussed with respect to creating and selecting a training path. In some embodiments, the initial training path may not be created by mobile unit 104, but instead designed and submitted to mobile unit 104 by a trainer, coach or the athlete. The training path may be any length and last any amount of time. Preferably, the training path lasts long enough and includes several types of motions associated with various athletic skills, so that mobile unit 104 has enough data to analyze the performance of athlete 102.

During a second step 1504, mobile unit 104 preferably monitors athlete 102. This step may be similar to, and comprise many steps such as those discussed in the previous embodiments with respect to determining the athlete's location, speed, the location of mobile unit 104 as well as storing this information. In particular, second step 1504 may incorporate all or some of steps 1106, 1108, 1110, 1112 and 1116, associated with a previous embodiment and illustrated in FIG. 11.

At a predetermined point in the training session, mobile unit 104 preferably proceeds to third step 1506. During this step 1506, mobile unit 104 may analyze some or all of the data associated with the motion of athlete 102. For example, mobile unit 104 may determine the top linear speed, top lateral speed, as well as top linear and lateral accelerations achieved by athlete 102. In some embodiments, mobile unit 104 may further process this information using various types of pattern recognition algorithms as are commonly known in the field of machine learning, including, but not limited to clustering algorithms, neural network algorithms, genetic algorithms, linear discriminant algorithms, Monet Carlo algorithms, Markov Chain algorithms, as well as other types of algorithms.

Figure 16:
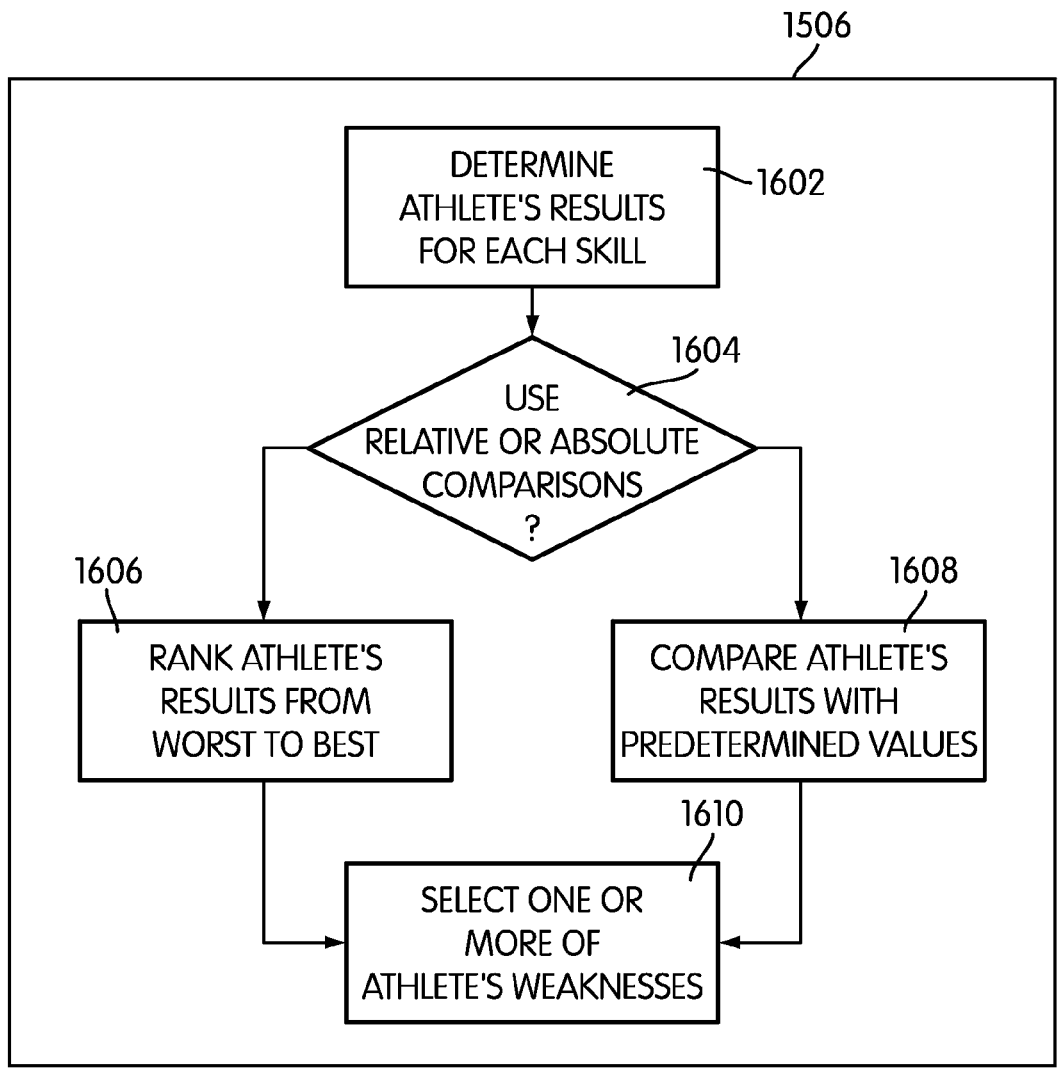
FIG. 16 is a flow chart of a preferred embodiment of a method associated with a mobile unit.

FIG. 16 is a flow chart of a preferred embodiment of the sub-processes associated with third step 1506. During sub-step 1602, the performances of athlete 102 with respect to each different athletic skill may be determined. In other words, the top linear speed, top turning speed and the top linear acceleration of athlete 102 may be determined, as well as results for other athletic skills. Following sub-step 1602, mobile unit 104 may proceed to sub-step 1604.

Preferably, during sub-step 1604, the results of athlete 102 associated with different athletic skills are ranked. In some embodiments, this ranking may be relative. In other words, mobile unit 104 may determine which athletic skills athlete 102 is better at and which athletic skills athlete 102 is worse at, when considering only the performance results of athlete 102. For example, if athlete 102 has a right turning speed of 7 meters per second and a left turning speed of 8 meters per second, mobile unit 104 may rank the athlete's performance in right turning speed as better than the performance in left turning speed. In this case, mobile unit 104 preferably moves to from sub-step 1604 sub-step 1606.

In other embodiments, mobile unit 104 may include a set of pre-programmed values that may be compared with the results achieved by athlete 102. For example, a trainer or coach may want athlete 102 to be able to run a minimum of 8 meters per second, or 100 meters in 10 seconds. Therefore, mobile unit 104 may use this information to rank the linear speed of an athlete depending on how the athlete's linear speed compares with the linear speed expected by the coach. In this case, mobile unit 104 preferably proceeds from sub-step 1604 to sub-step 1608.

Finally, mobile unit 104 preferably proceeds to sub-step 1610 by way of either sub-step 1606 or sub-step 1608. During sub-step 1610, mobile unit 104 preferably selects one or more of the weaknesses of athlete 102, based on either relative or absolute ranking of the results for each athletic skill.

Referring back to FIG. 15, mobile unit 104 may proceed to fourth step 1508, following third step 1506. During fourth step 1508, mobile unit 104 may create a new training path based on one or more of the weaknesses of athlete 102.

Figure 17:
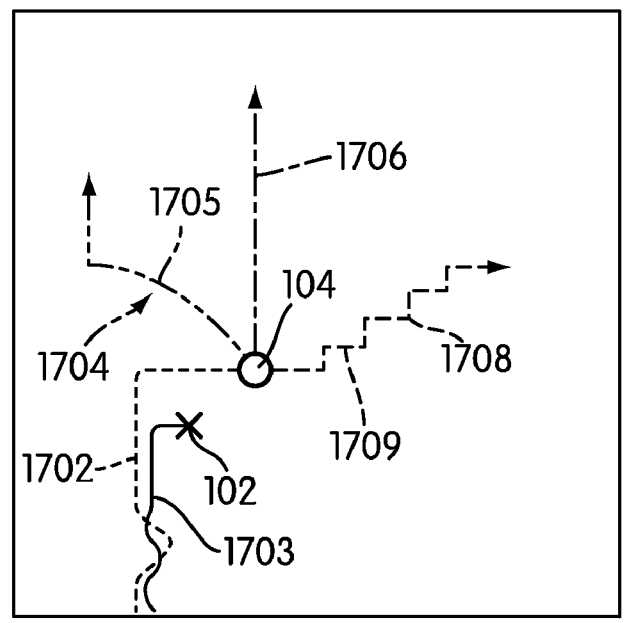
FIG. 17 is a schematic view of a preferred embodiment of a training path.

FIG. 17 is a preferred embodiment of mobile unit 104 once it has completed first training path 1702 and determined one or more weaknesses of athlete 102 as athlete 102 moves along chasing path 1703. Second path 1704, third path 1706 and fourth path 1708 represent possible training paths that may be selected by mobile unit 104. In this embodiment, second path 1704 includes left banking portion 1705, and therefore second path 1704 may be useful in training an athlete with poor left banking speed. Third path 1706 is a straight linear path, and therefore may be most useful in training an athlete with poor linear speed. Fourth path 1708 includes short lateral portions 1709, and therefore may be useful in training an athlete with poor lateral speed and/or turning speed.

Figure 18:
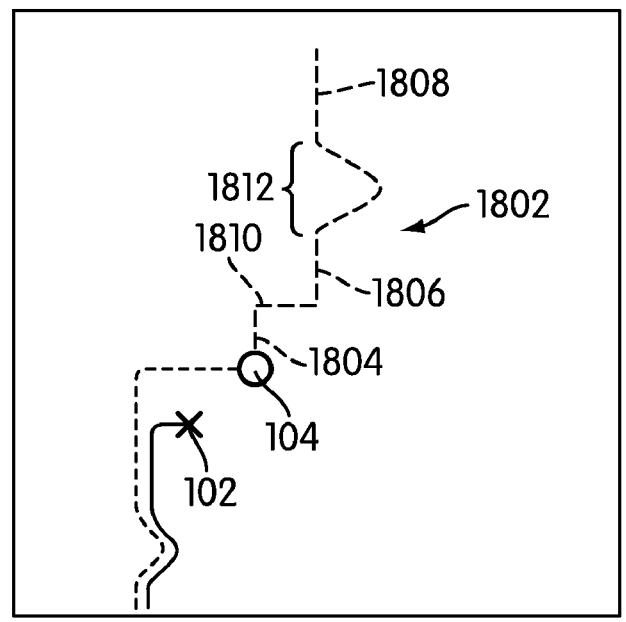
FIG. 18 is a schematic view of a preferred embodiment of a training path.

In another embodiment, seen in FIG. 18, mobile unit 104 may select a more sophisticated training path to stress the weaknesses of athlete 102. In this embodiment, future training path 1802 preferably includes first linear portion 1804, second linear portion 1806 and third linear portion 1808, as well as lateral portion 1810 and banking portion 1812. Path 1802 may be useful in training an athlete with deficiencies in linear speed and banking speed.

Figure 19:
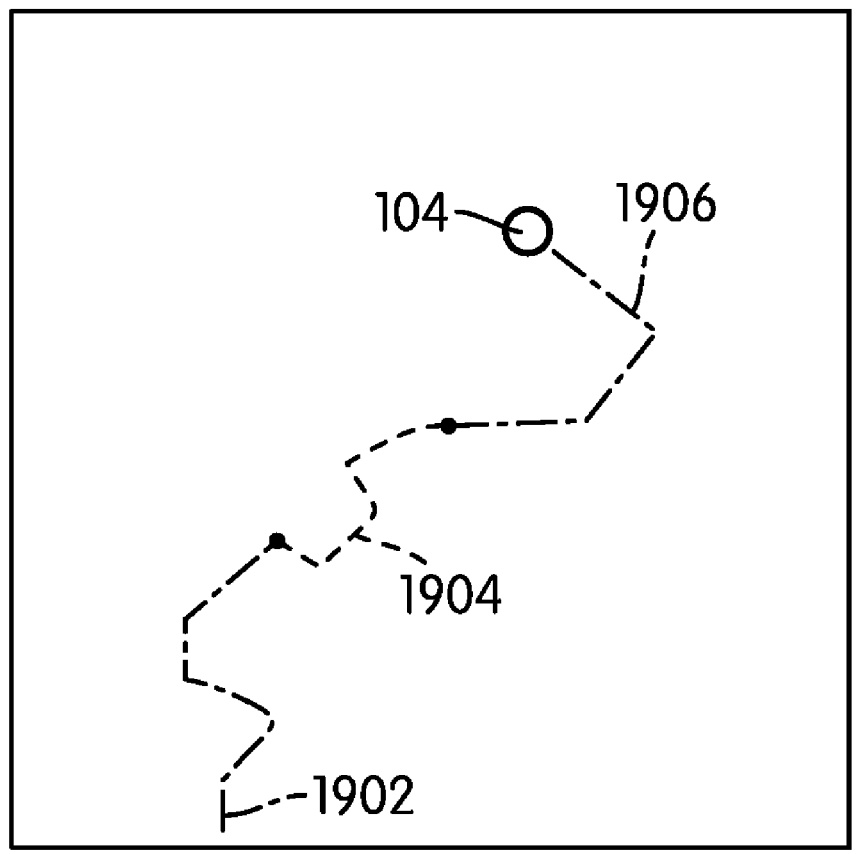
FIG. 19 is a schematic view of a preferred embodiment of a training path.

Preferably, mobile unit 104 continues to learn the strengths and weaknesses of athlete 102 during the entire training session. In some embodiments, mobile unit 104 may generate additional training paths, without end, with each training path based on deficiencies learned by monitoring athlete on previous paths. For example, in FIG. 19, mobile unit 104 may start with first path 1902, that is generated randomly. Following this, mobile unit 104 learns the weaknesses of athlete 102, using the methods and processes described in earlier embodiments, and generates second path 1904 to stress these weaknesses. Once mobile unit 104 has reached the end of second path 1904, it may re-evaluate the performance of athlete 102 and determine a next training path 1906, to stress weaknesses learned during execution of first path 1902 and second path 1904.

In an alternative embodiment, mobile unit 104 may be configured to chase athlete 102, rather than be chased by athlete 102. In such embodiments, mobile unit 104 will not predetermine possible training paths or receive a fixed training path, but rather will adjust its motion according to the motions of athlete 102.

In the previous embodiments, mobile unit 104 included a mobility system that was ground-based. The mobility system included wheels or legs, for example. In some cases, a mobile unit could include an air-based mobility system. The term 'air-based mobility system' refers to any mobility system where the mobile unit does not touch the ground. The following detailed description refers to various embodiments of air-based mobility systems associated with a mobile unit for the purposes of adaptive training.

Throughout the remainder of this detailed description only variations in the type of mobility system associated with a mobile unit are discussed. It should be understood, however, that each of the mobile units discussed may be configured with similar provisions as those associated with the mobile unit of the previous embodiment. Preferably, each mobile unit of the following embodiments is generally identical to mobile unit 104 as discussed with reference to FIG. 4, except for the type of mobility system being employed. In other words, each mobile unit is preferably associated with some or all of the cameras, sensors, transmitters/receivers, data bases, remote computers and other similar provisions associated with mobile unit 104 of the previous embodiment.

Furthermore, throughout the remainder of this detailed description, each of the following embodiments may also include provisions associated with an athlete similar to those discussed with respect to FIG. 4. For example, in each of the following embodiments the athlete may be configured with an assortment of sensors, including GPS and RFID sensors, as well as transmitters and receivers configured to communicate with the mobile unit. Additionally, each of the practice fields discussed in the following embodiments may include some, all, or none of the provisions previously discussed for facilitating a training system, such as RFID or similar beacons configured to allow the mobile unit to determine absolute positions of the mobile unit and the athlete on the practice field.

Using these provisions associated with mobile unit 104, each of the mobile units of the following embodiments is preferably configured to monitor an athlete and adjust the motion of the mobile unit accordingly in order to adaptively train the athlete, as previously discussed. In other words, each of the methods for adaptively training an athlete that were discussed in the previous embodiments may be applied to the mobile units of the following embodiments. Furthermore, each of the mobile units of the following embodiments may include provisions that allow a pre-designated training path, that is submitted by a coach or other user, to be executed. Each of the mobile units of the following embodiments may also execute randomized paths and preferably include provisions for determining when or if the athlete is nearby in order to avoid getting 'caught', as discussed in the previous embodiments.

Figure 20:
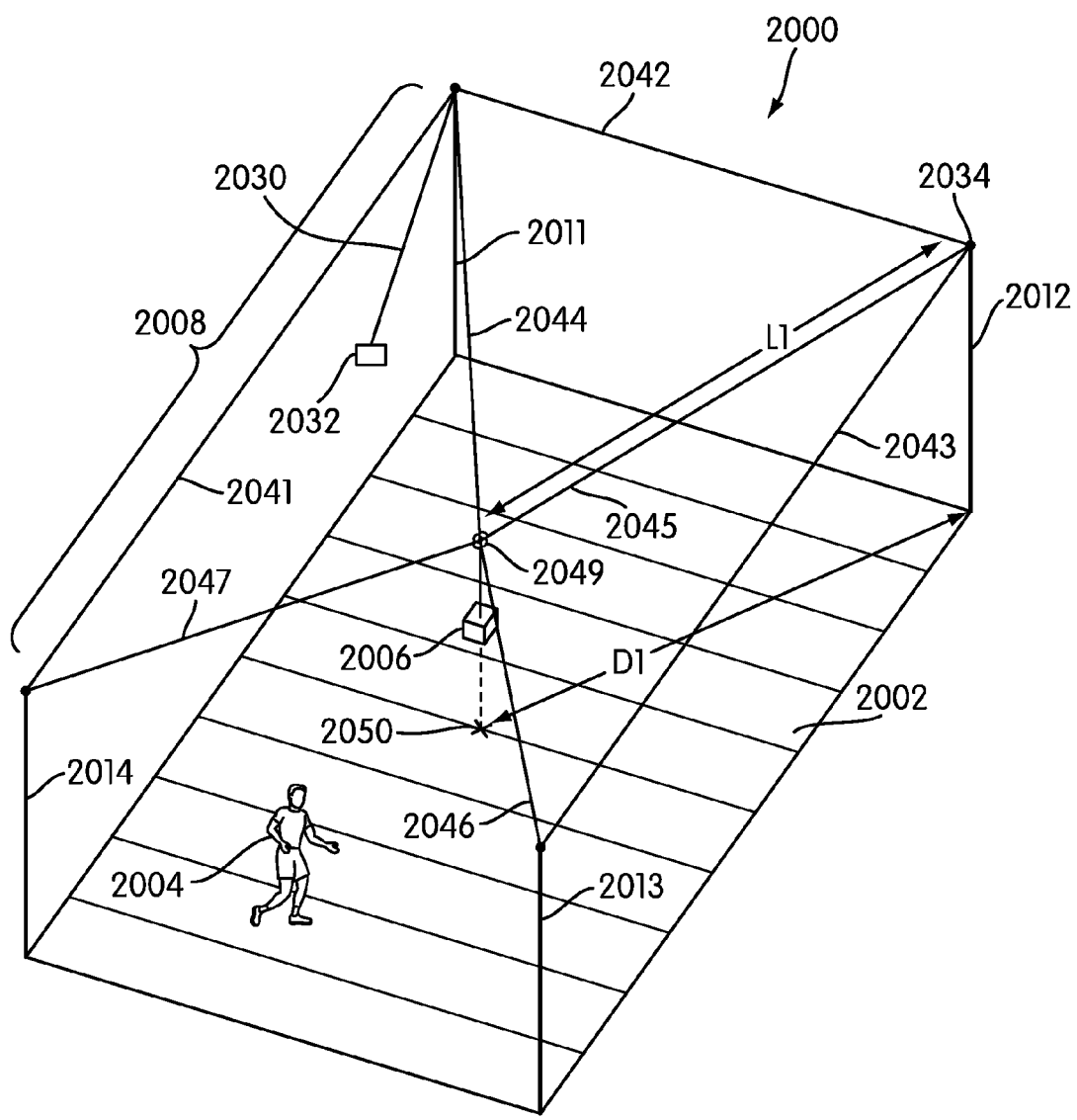
FIG. 20 is a preferred embodiment of a mobile unit associated with a cable-based mobility system.
Figure 21:
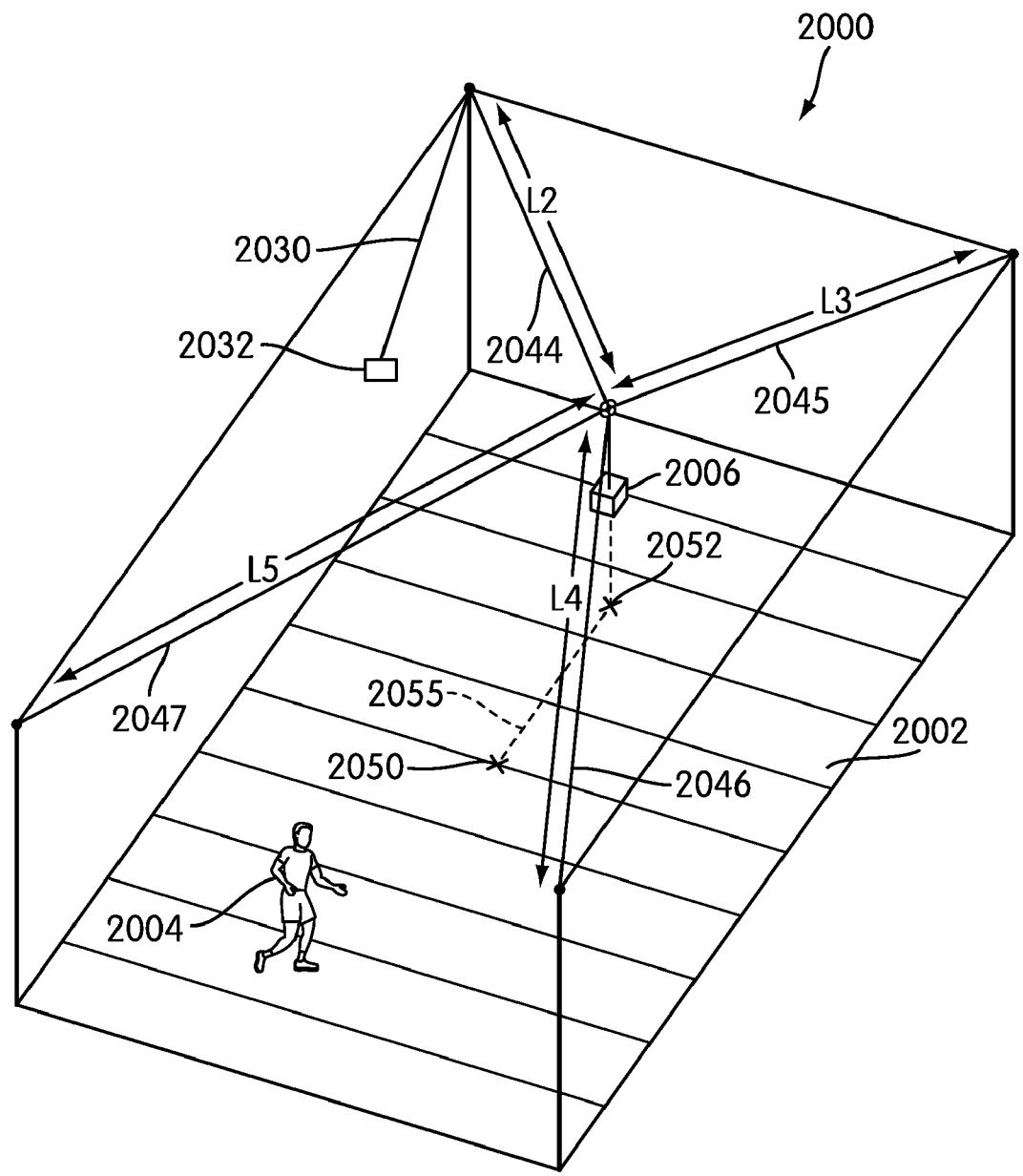
FIG. 21 is a preferred embodiment of a mobile unit associated with a cable-based mobility system.
Figure 22:
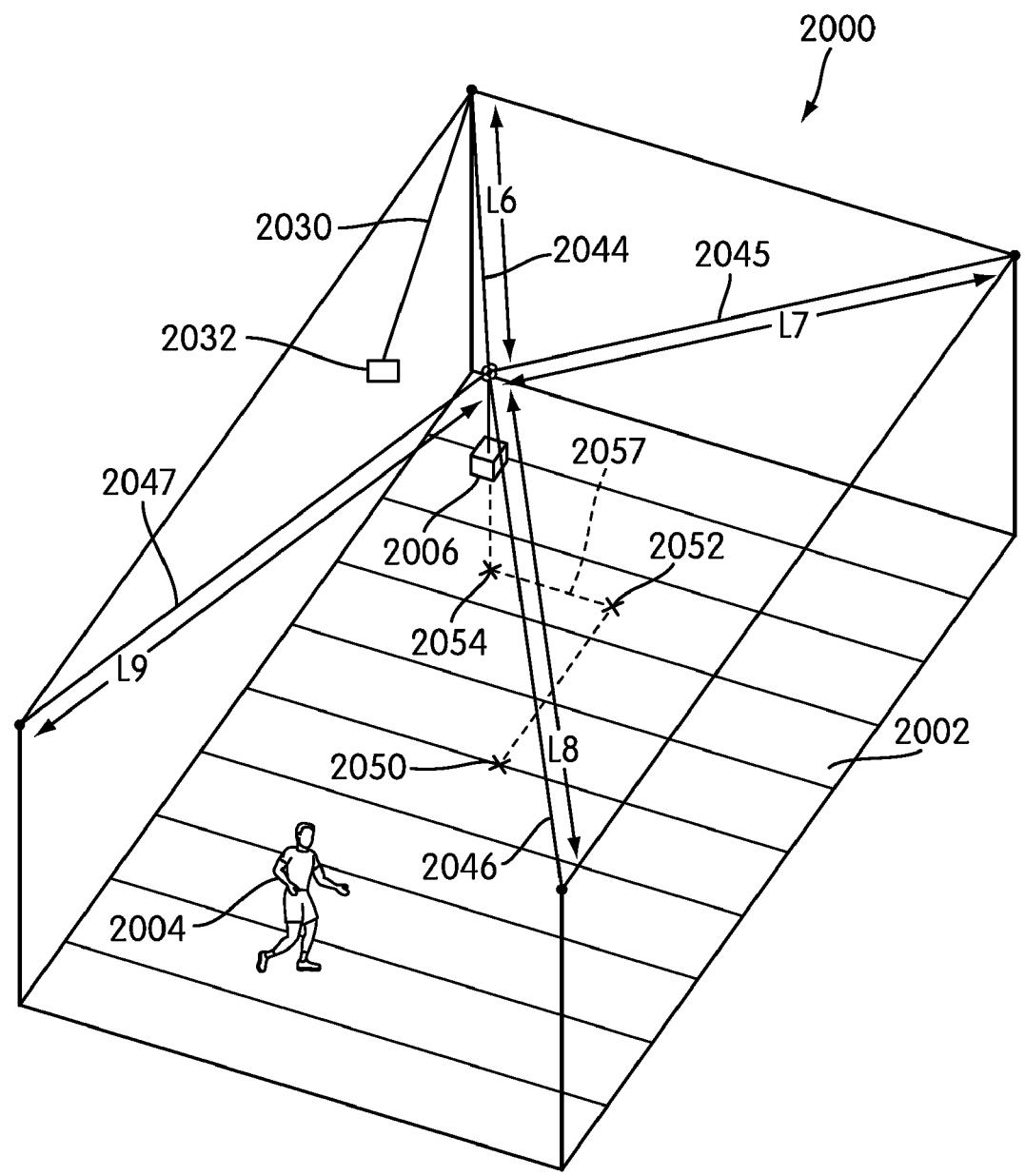
FIG. 22 is a preferred embodiment of a mobile unit associated with a cable-based mobility system.

FIGS. 20-22 are a preferred embodiment of training system 2000. As with the previous embodiments, training system 2000 preferably includes practice field 2002. For the purposes of clarity, practice field 2002 is shown here as a football field. In other embodiments, practice field 2002 could be any other type of practice field, including the various examples listed in previous embodiments such as football fields, soccer pitches or fields, lacrosse fields, basketball courts, as well as other types of fields and/or courts including any type of open space that may be used for training purposes.

Preferably, training system 2000 may also include mobile unit 2006 configured to train athlete 2004. As with the previous embodiments, training system 2000 is preferably configured so that athlete 2004 chases mobile unit 2006 on practice field 2002. Preferably, during this chasing activity, mobile unit 2006 is always moving in a way to avoid being caught by athlete 2004. As mobile unit 2006 constantly changes direction and/or speed, athlete 2004 must adjust to the new direction and speed in an attempt to catch mobile unit 2006. Preferably, mobile unit 2006 moves in a way so that, as athlete 2004 follows mobile unit 2006, athlete 2004 is moving linearly, laterally, accelerating and decelerating over the course of a training session.

In the current embodiment, mobile unit 2006 may be associated with mobility system 2008. Mobility system 2008 may be a cable-based mobility system. Cable-based mobility systems are known in the art and examples of various types can be found in U.S. Pat. Nos. 6,975,089 and 7,127,998, both of which are incorporated herein by reference in their entirety.

In the current embodiment, mobility system 2008 includes a plurality of support members. In some embodiments, mobility system 2008 may include four support members, including first support member 2011, second support member 2012, third support member 2013 and fourth support member 2014. Preferably, first support member 2011 may be associated with first corner 2021 of practice field 2002. Likewise, second support member 2012, third support member 2013 and fourth support member 2014 may be associated with second corner 2022, third corner 2023 and fourth corner 2024, respectively. In other embodiments, support members 2011-2014 could be placed anywhere along or outside of practice field 2002.

Although the preferred embodiment includes four support members, in other embodiments a different number of support members may be used. Preferably, at least three support members are used in order to provide for a full range of motion. Furthermore, support members 2011-2014 could be any structures configured for support, including columns, posts and towers. In some embodiments, support members 2011-2014 may not be oriented vertically, but could be horizontal disposed or cantilever-like, including bases that are fixed to a portion of any stands surrounding practice field 2002.

Preferably, support members 2011-2014 may be associated with cable system 2030. Cable system 2030 preferably includes a plurality of cables. The cables comprising cable system 2030 could be made of any material that is strong enough to hold mobile unit 2006. Examples of materials include, but are not limited to, steel cables, steel chains, bungee cords as well as other types of materials.

The cables comprising cable system 2030 can be divided into several portions, including first cable portion 2041, second cable portion 2042, third cable portion 2043, fourth cable portion 2044, fifth cable portion 2045, sixth cable portion 2046, and seventh cable portion 2047. First cable portion 2041 extends between first support member 2011 and fourth support member 2014. Second cable portion 2042 extends between first support member 2011 and second support member 2012. Third cable portion 2043 extends between second support member 2012 and third support member 2013. Fourth cable portion 2044 extends between first support member 2011 and mobile unit 2006. Fifth cable portion 2045 extends between second support member 2012 and mobile unit 2006. Sixth cable portion 2046 extends between third support member 2013 and mobile unit 2006. Seventh cable portion 2047 extends between fourth support member 2014 and mobile unit 2006. Generally, cable portions 2041-2043 are fixed in length, because the distances between an two support members 2011-2014 is fixed in length. However, the lengths of cable portions 2044-2047 may be made to vary, as will be discussed.

For the purposes of clarity, each cable portion 2041-2047 are illustrated here as single cables. In some embodiments, each cable portion 2041-2047 may comprise two or more cables in parallel.

In the preferred embodiment, mobile unit 2006 hangs between cable portions 2044-2047. This configuration may be achieved by using line support members 2049. Line support members 2049 are preferably configured to allow cable portions 2044-2047 to slide or move with respect to mobile unit 2006 while also allowing mobile unit 2006 to hang on cable portions 2044-2047.

Mobility system 2008 preferably includes pulley system 2034, comprising a plurality of pulleys associated with support members 2011-2014. Pulley system 2034 may facilitate the movement of the cables comprising cable system 2030 between support members 2011-2014. Pulley system 2034 may include pulleys disposed at the top of each support member 2011-2014. Pulley system 2034 may also comprise various pulleys disposed along the length of one or more support members 2011-2014.

Mobility system 2008 preferably also includes cable driver 2032. Cable driver 2032 is configured to receive at least one of the plurality of cables comprising cable system 2030. Cable driver 2032 is preferably motorized and may be used to pull the cables comprising cable system 2030. As cable driver 2032 pulls on the cables comprising cable system 2030, these cables may move over the pulleys comprising pulley system 2034 for near-frictionless motion between support members 2011-2014. In some embodiments, cable driver 2032 may be configured to supply additional cable to, or retract cable from, cable system 2030. In other words, in some cases, the total length of all the cables comprising cable system 2030 may be varied.

FIGS. 20-22 are intended to illustrate how the location of mobile unit 2006 varies as the lengths of cable portions 2044-2047 are varied using cable driver 2032. This detailed description is only intended to emphasize the general features of mobility system 2008. The previously discussed disclosures regarding cable-based mobility systems may be referred to for a detailed arrangement of cables, pulleys and a cable driving system in order to achieve movement, as well as possible variations of cable and pulley arrangements.

In FIG. 20, mobile unit 2006 is preferably disposed in an initial position that is associated with first position 2050 in the center of practice field 2002. In this embodiment, each of the cable portions 2044-2047 is associated with an identical length L1. It should be understood that because cable portions 2044-2047 are not parallel to practice field 2002, the lengths L1 will be slightly greater than the distances D1 between each support member 2011-2014 and first position 2050.

Referring to FIG. 21, mobile unit 2006 may be moved from a first position 2050 to a second position 2052, along a first path 2055, by actuating cable driver 2032 to pull cable system 2030 so that the lengths of cable portions 2044-2047 are modified in order to achieve this repositioning. In this embodiment, when mobile unit 2006 is at a second position 2052, fourth cable portion 2044 has a length of L2, fifth cable portion 2045 has a length of L3, sixth cable portion 2046 has a length of L4 and seventh cable portion 2047 has a length of L5. Generally, lengths L2 and L3 may be shorter than lengths L4 and L5.

Referring to FIG. 22, mobile unit 2006 may be moved from second position 2052 to third position 2054, along second path 2057, by further actuation of cable driver 2032 in order to modify the lengths of cable portions 2044-2047. In this embodiment, when mobile unit 2006 is at third position 2054, fourth cable portion 2044 has a length L6, fifth cable portion 2045 has a length L7, sixth cable portion 2046 has a length L8 and seventh cable portion 2047 has a length L9.

Figure 23:
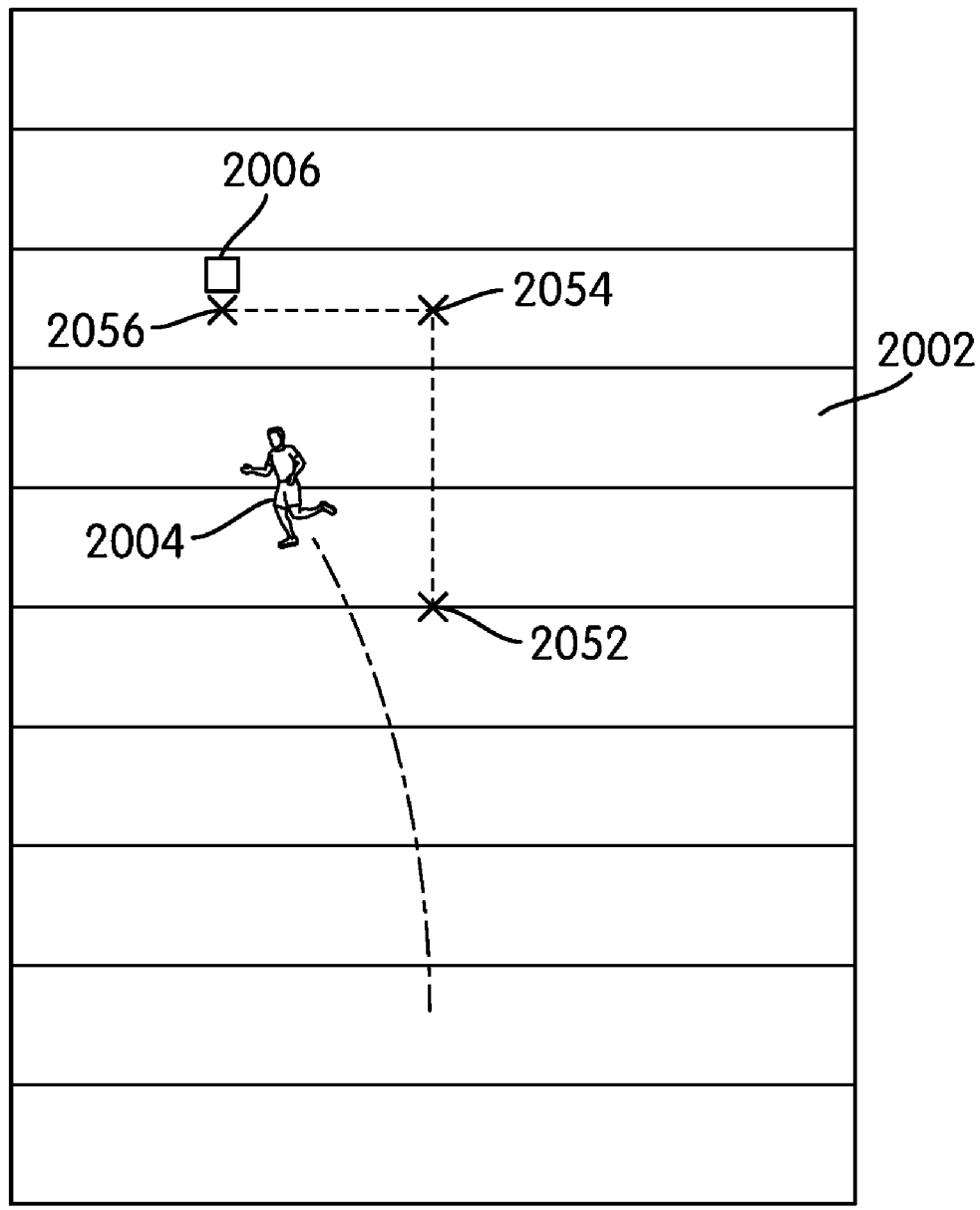
FIG. 23 is a top down view of a preferred embodiment of a path of a mobile unit.

FIG. 23 is a top down view of the path that is traced out by mobile unit 2006 as projected onto practice field 2002 during the previous steps. This path demonstrates that a cable-based mobility system may be used in a manner similar to wheel-based mobility systems used in the previous embodiments for transporting a mobile unit. Assuming that mobile unit 2006 is fixed at eye-level, or includes a portion that extends downwards to eye-level or below, athlete 2004 may easily chase mobile unit 2006 in a manner similar to the way athlete 102 chased mobile unit 104 in the previous embodiment (see FIGS. 1-2). Using this configuration, athlete 2004 may be monitored for weaker athletic skill types and the training paths executed by mobile unit 2006 may be adjusted accordingly. Also, in some embodiments, athlete 2004 may chase mobile unit 2006 over a designated training path, or a randomized training path, as is discussed on previous embodiments.

Figure 24:
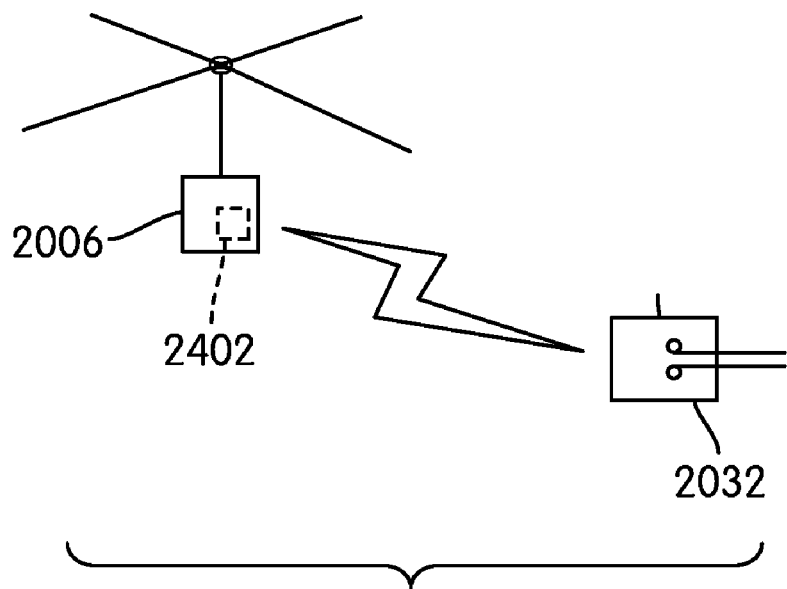
FIG. 24 is a preferred embodiment of a mobile unit in communication with a cable driver.

Preferably the transitions between first position 2050 to second position 2052 and between second position 2052 and third position 2054 may be performed so that the movement of mobile unit 2006 is smooth and not jerky. Additionally, these movements may be performed quickly, at speeds relevant to training an athlete. The uses of similar cable-based mobility systems for controlling the location of overhead cameras at various sporting events attest to the ability of such systems to achieve fast and smooth motions. In particular, using this type of cable-based mobility system, any type of training path over practice field 2002 may be executed by mobile unit 2006, including the exemplary paths discussed in the previous embodiments In the current embodiment, the movement of mobile unit 2006 is controlled using cable driver 2032 and cable system 2030. Referring to FIG. 24, cable driver 2032 is actuated by a control unit associated with mobile unit 2006. In a preferred embodiment, mobile unit 2006 includes control unit 2402 configured to communicate with cable driver 2032 wirelessly. In other embodiments, fiber optic cables could be associated with cable system 2030, allowing for a fiber optic connection between mobile unit 2006 and cable driver 2032. In particular, control unit 2402 could communicate with cable driver 2032 using fiber optic communication.

The current embodiment is only intended as an example of a mobility system that incorporates the use of cables. Generally, any arrangement of cables, support members and systems for driving the cables that allow a mobile unit to be moved across the entirety of a field may be used.

In some embodiments, mobile unit 2006 may be maintained at or around the 'eye-level' of the athlete. In some cases, however, this may not be feasible or desirable, due to constraints associated with mobility system 2008. Instead, in some embodiments, various objects may be associated with, and configured to hang below, mobile unit 2006.

Figure 25:
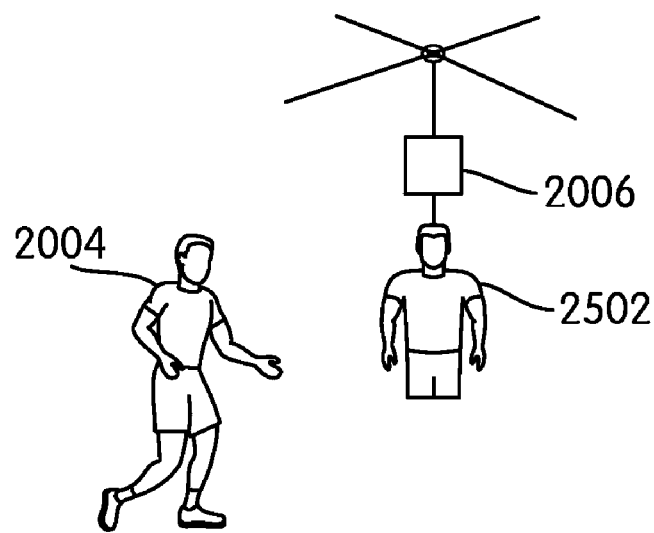
FIG. 25 is a preferred embodiment of a mobile unit including a suspended dummy.

FIG. 25 is a preferred embodiment of mobile unit 2006 including dummy 2502. Dummy 2502 may be configured to look like an athlete, increasing the realism of this adaptive training method. In some embodiments, dummy 2502 may include a just a head, or another shape altogether, such as a circle including a two-dimensional face. Generally, any kind of object could be hung from mobile unit 2006 that may help focus athlete 2004 on following after mobile unit 2006, especially in cases where mobile unit 2006 may be at a height far above athlete 2004. In some embodiments, multiple shapes and/or forms may be associated with mobile unit 2006, each shape and/or form being separately detachable from mobile unit 2006 using hooks, Velcro or similar methods of attachment.

This preferred arrangement allows for increased realism during training, as athlete 2004 may chase an object that more closely resembles another athlete. Furthermore, hanging objects may be used with any air-based mobile unit, including mobile units associated with any type of air-based mobility system and are not limited to mobile units associated with cable-based mobility systems.

The preceding embodiment utilizes a particular example of a cable-based mobility system in order to achieve adaptive training of athlete 2004 using mobile unit 2006. In other embodiments, various other cable-based mobility systems could be used to move a mobile unit. Furthermore, other types of air-based mobility systems, especially various types of suspension systems, could be used to move a mobile unit.

Figure 26:
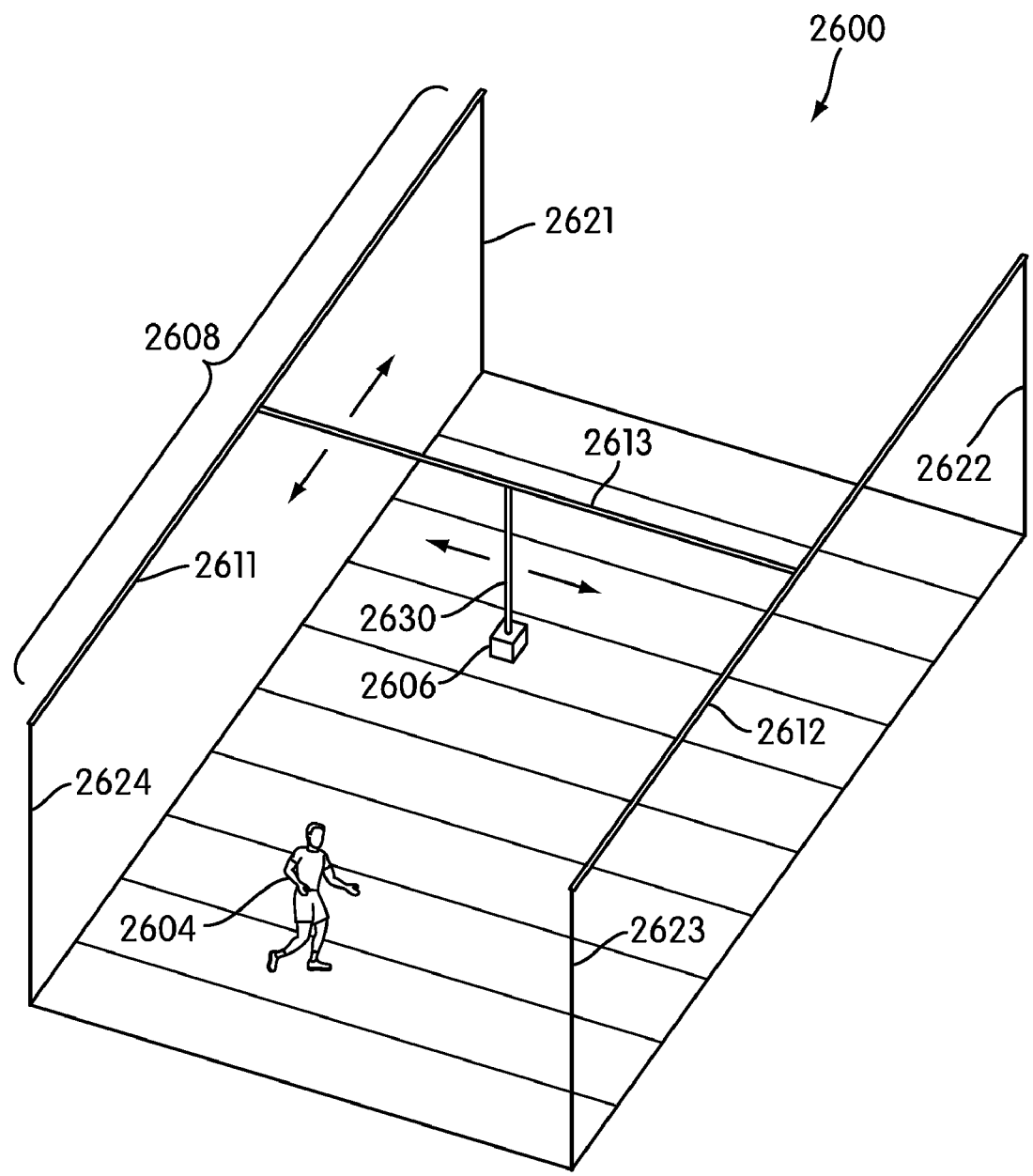
FIG. 26 is a preferred embodiment of a mobile unit associated with a track-based mobility system.

FIG. 26 is a preferred embodiment of training system 2600 that is configured to train athlete 2604. Preferably, training system 2600 includes mobile unit 2606. Mobile unit 2606 preferably includes a control unit, as well as other provisions that have been previously discussed, configured to monitor athlete 2604 and move mobile unit 2606 in a way that adaptively trains athlete 2604.

In the current embodiment, the motion of mobile unit 2606 is preferably controlled by mobility system 2608. Mobility system 2608 may be a track-based system. Preferably, mobility system 2608 comprises a first track 2611 and a second track 2612 that are supported by first track support member 2621, second track support member 2622, third track support member 2623 and fourth track support member 2624. Additionally, mobility system 2608 may comprise third track 2613 that is disposed between, and perpendicular to, first track 2611 and second track 2612. Furthermore, mobility system 2608 preferably includes vertical support 2630, configured to connect mobile unit 2606 with third track 2613.

Preferably, third track 2613 may be configured to move with respect to tracks 2611 and 2612, in a direction parallel to tracks 2611 and 2612. Likewise, vertical support 2630 may be configured to move with respect to third track 2613 in a direction parallel to third track 2613. Third track 2613 and vertical support 2630 may move using a motorized track system of some kind. Details of one type of track system can be found in U.S. Pat. No. 5,568,189, the entirety of which is incorporated here by reference.

Using mobility system 2608, mobile unit 2606 may be configured to move with respect to practice field 2602 in a manner that allows athlete 2604 to chase mobile unit 2606. It is clear from this preferred configuration that mobile unit 2606 may be moved to any location just above practice field 2602. Furthermore, as with the previous cable-based mobility system, mobility system 2608 can be configured for quick and smooth movements, allowing for an effective training system 2600.

Figure 27:
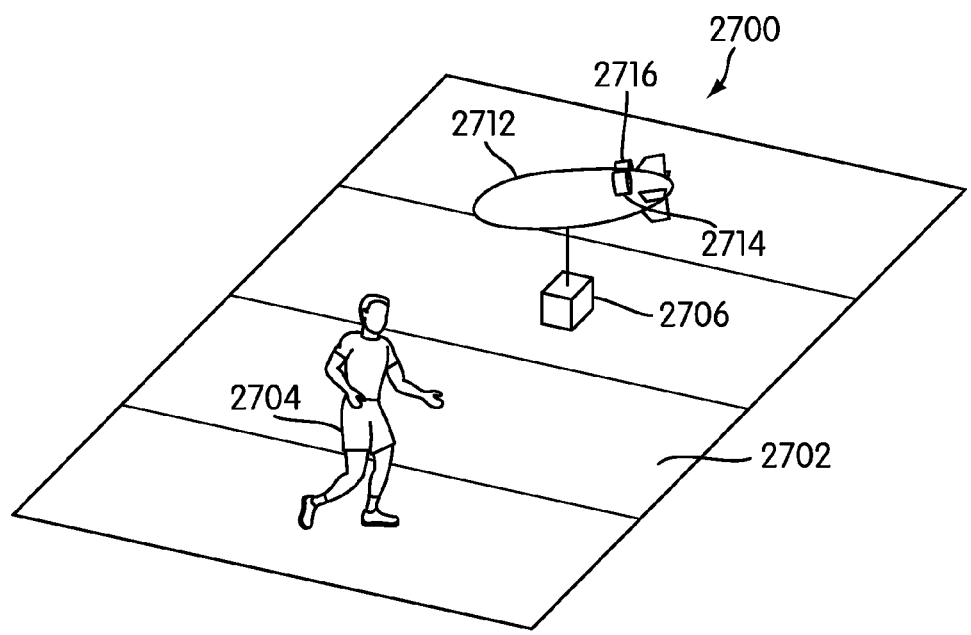
FIG. 27 is a preferred embodiment of a mobile unit suspended from a balloon.
Figure 28:
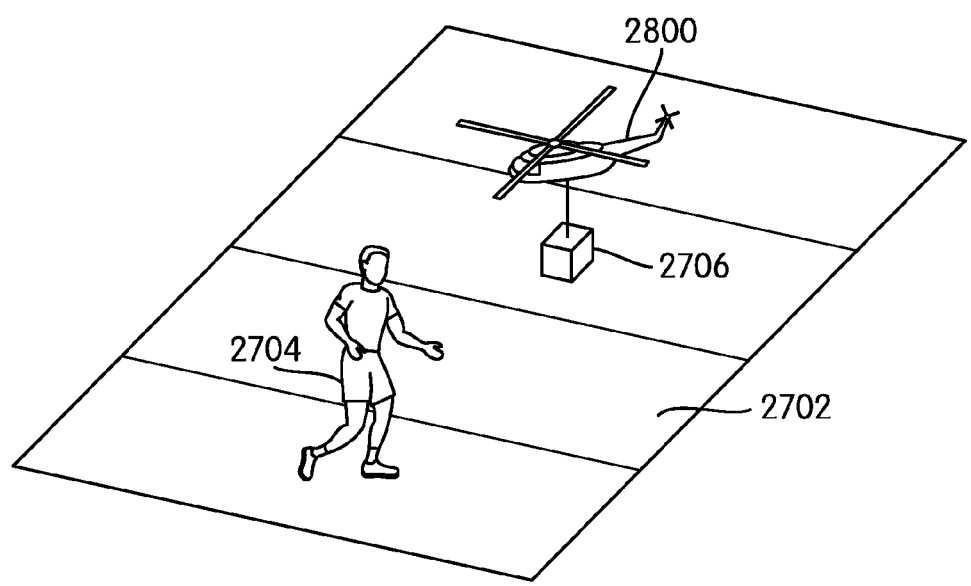
FIG. 28 is a preferred embodiment of a mobile unit suspended from a helicopter.

The mobile units of the previous embodiments made use of suspension systems. In other embodiments, the mobile unit of a training system may not be suspended using tracks or cables, but instead may float, fly, or hover using various provisions associated with air-borne devices. The following embodiments, seen in FIGS. 27-28, are intended to illustrate various types of air-based mobility systems that may be used to move mobile units. It should be understood that each of the following mobility systems can be used with a mobile unit that is further associated with a control unit and one or more provisions for monitoring an athlete and/or a mobile unit, including provisions for storing, sending and receiving various kinds of information associated with the motion of the athlete or mobile unit. In other words, the following embodiments are each configurable and intended to be used in association with an adaptive training system in a similar manner to training systems previously discussed.

FIG. 27 is a preferred embodiment of training system 2700. Preferably, training system 2700 includes mobile unit 2706 that is configured to train athlete 2704 on practice field 2702. Preferably, mobile unit 2706 includes mobility system 2708 configured to move or transport mobile unit 2706 across practice field 2702.

In the current embodiment, mobility system 2708 is a balloon-based system. Preferably, mobile unit is attached to balloon 2712. Balloon 2712 may be any type of balloon configured to carry mobile unit 2706. In the current embodiment, balloon 2712 has a blimp-like shape, however in other embodiments, balloon 2712 could have any shape.

Preferably, balloon 2712 may be filled with hydrogen, helium, or another lightweight gas that allows for flotation of mobile unit at or around eye-level. Mobility system 2708 also preferably includes provisions for horizontal motion along a plane parallel to practice field 2702. In the current embodiment, these provisions include first fan 2714 and second fan 2716, configured to project balloon 2712 and mobile unit 2706 in a forward and/or rearward direction, depending on the speed and direction of rotation of fans 2714 and 2716. Additionally, by running fans 2714 and 2716 at different speeds, balloon 2712 and mobile unit 2706 may be rotated, allowing for turning.

Other examples of 'floating robots' are known and can be found in U.S. Pat. No. 6,278,904, the entirety of which is incorporated here by reference. Additionally, in other embodiments, mobile unit 2706 could be attached to other flying devices. In an alternative embodiment, for example, mobile unit 2706 could be attached to remote controlled helicopter 2800, as seen in FIG. 28.

Generally, mobile unit 2706 could be used with any of these various types of flying mobility systems. As with the previous embodiments, the motion of these mobility systems could be controlled by a control unit associated with mobile unit 2706, according to information received from various sensors regarding the motion of athlete 2704.

Figure 29:
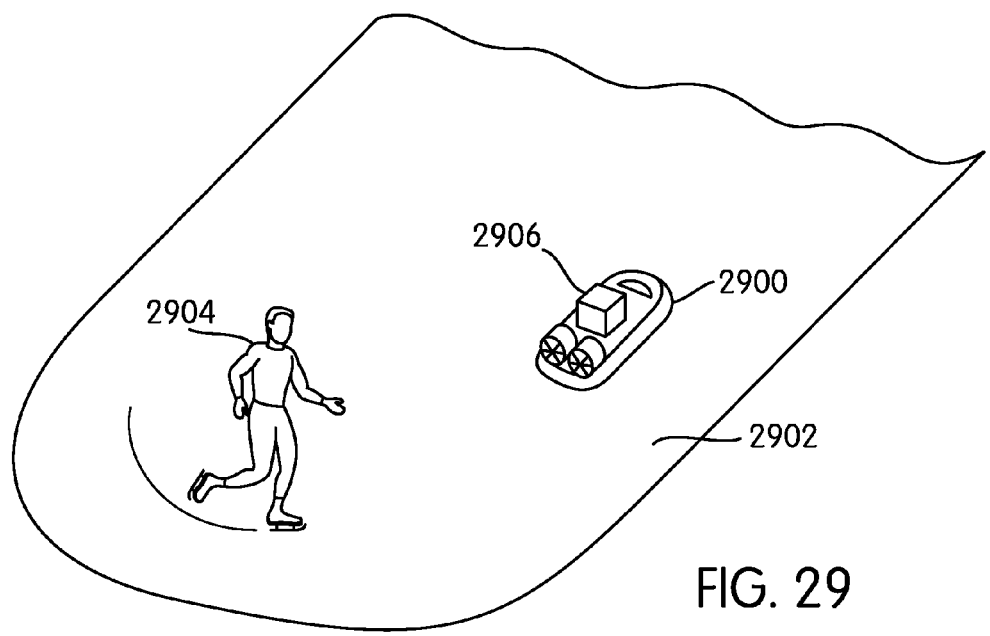
FIG. 29 is a preferred embodiment of a mobile unit associated with a hovercraft.

In some embodiments, a mobile unit could be configured to train an ice skater or hockey player, using a mobility system that could move around on ice. In one embodiment, mobile unit 2906 could be associated with hover craft 2900, as seen in FIG. 29. Hover craft 2900 is preferably configured to slide around over ice rink 2902, allowing athlete 2904 to chase hover craft 2900, including mobile unit 2906. As with the previous embodiments, mobile unit 2906 is preferably associated with various provisions that allow for the monitoring of athlete 2904 in order to adaptively train athlete 2904.

In the previous embodiments, a mobile unit was a physical object that moved around a practice field. In some embodiments, rather than using a mobile unit, that is a physical object or device, an adaptive training system may comprise a projected target. The projected target could be a beam of light, for example, that is shone on the floor of a gymnasium. As the projected target moves, the athlete could follow the motion of the projected target in a manner similar to the way the athlete would follow a three-dimensional mobile unit that moved in front of the athlete.

Figure 30:
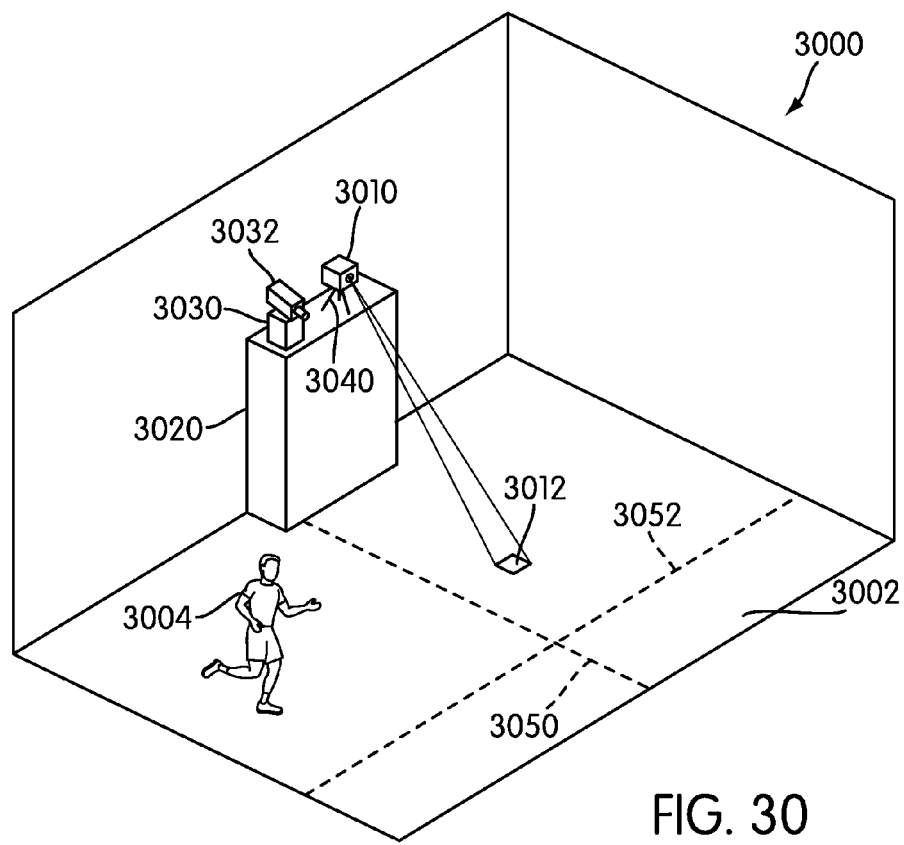
FIG. 30 is a preferred embodiment of a training system including a projector.

FIG. 30 is a preferred embodiment of adaptive training system 3000. Preferably, adaptive training system 3000 includes practice field 3002. In this embodiment, practice field 3000 is a gymnasium floor, however in other embodiments, any type of practice field could be used. Preferably, the type of practice field used allows for easy visualization of projected light beams. In other words, preferably the lighting is dim enough and the surface is smooth enough to allow athlete 3004 to see a light shone on practice field 3002.

In this embodiment, training system 3000 includes first projector 3010. First projector 3010 may be any type of projection system, including a spotlight, a laser, or any other type of projector. In some cases, first projector 3010 may project an image, rather than just a beam of light. In this preferred embodiment, first projector 3010 may be a projector configured to shine a narrow light beam.

Preferably, projected target 3012 may be projected onto practice field 3002 using first projector 3010. First projector 3010 may be disposed on top of first tower 3020 in order to increase the potential projection area. Generally, first projector 3010 may be disposed anywhere along practice field 3002 and at any height. In some cases, first projector 3010 may be suspended from a ceiling, in cases where practice field 3002 is indoors.

Preferably, training system 3000 also includes control unit 3030. Control unit 3030 may include or be associated with various provisions configured to monitor athlete 3004. In this embodiment, control unit 3030 includes camera 3032. In other embodiments, control unit 3030 may include other provisions for monitoring the motion of athlete 3004, including the provisions discussed in previous embodiments. In particular, each of the various provisions that were discussed in association with mobile unit 104 of a previous embodiment, including each of the provisions discussed with respect to FIG. 4, could be associated with control unit 3030. It should be understood that these additional provisions are optional, and all, some or no additional provisions for monitoring athlete 3004 may be used in some embodiments. Furthermore, any of the sensors, receivers and/or transmission devices associated with athlete 102 of the previous embodiments, including the provisions discussed with respect to FIG. 4, could also be used with athlete 3004 in the current training system.

Training system 3000 may also include mobility system 3040. Preferably, mobility system 3040 is configured to move first projector 3010 so that projected target 3012 may be moved anywhere on practice field 3002. For example, by raising or lowering the angle of first projector 3010, projected target 3012 may be moved in a direction parallel to first axis 3050 of practice field 3002. Likewise, by turning first projector 3010 to the left or right, projected target 3012 may be moved in a direction parallel to second axis 3052 of practice field 3002.

Mobility system 3040 is preferably associated with control unit 3030. Control unit 3030 may be disposed adjacent to mobility system 3040. Preferably, control unit 3030 is configured to control mobility system 3040, based on information gathered from various sensors.

Using this configuration, athlete 3004 may chase projected target 3012 around practice field 3002 along various paths selected by control unit 3030. As with the previous embodiments, control unit 3030 preferably receives information regarding the motion of athlete 3004, using camera 3032, for instance. In some embodiments, control unit 3030 may use the methods previously outlined for selecting new training paths and including training paths configured to stress weaknesses of the athlete.

Preferably, an adaptive training system includes provisions for displaying real-time information to a coach, an athlete, or a third party. In some cases, information regarding the athlete's speed, acceleration, and other performance characteristics as monitored by various sensors associated with a mobile unit may be displayed on a computer, television screens or other devices associated with a practice field.

Figure 31:
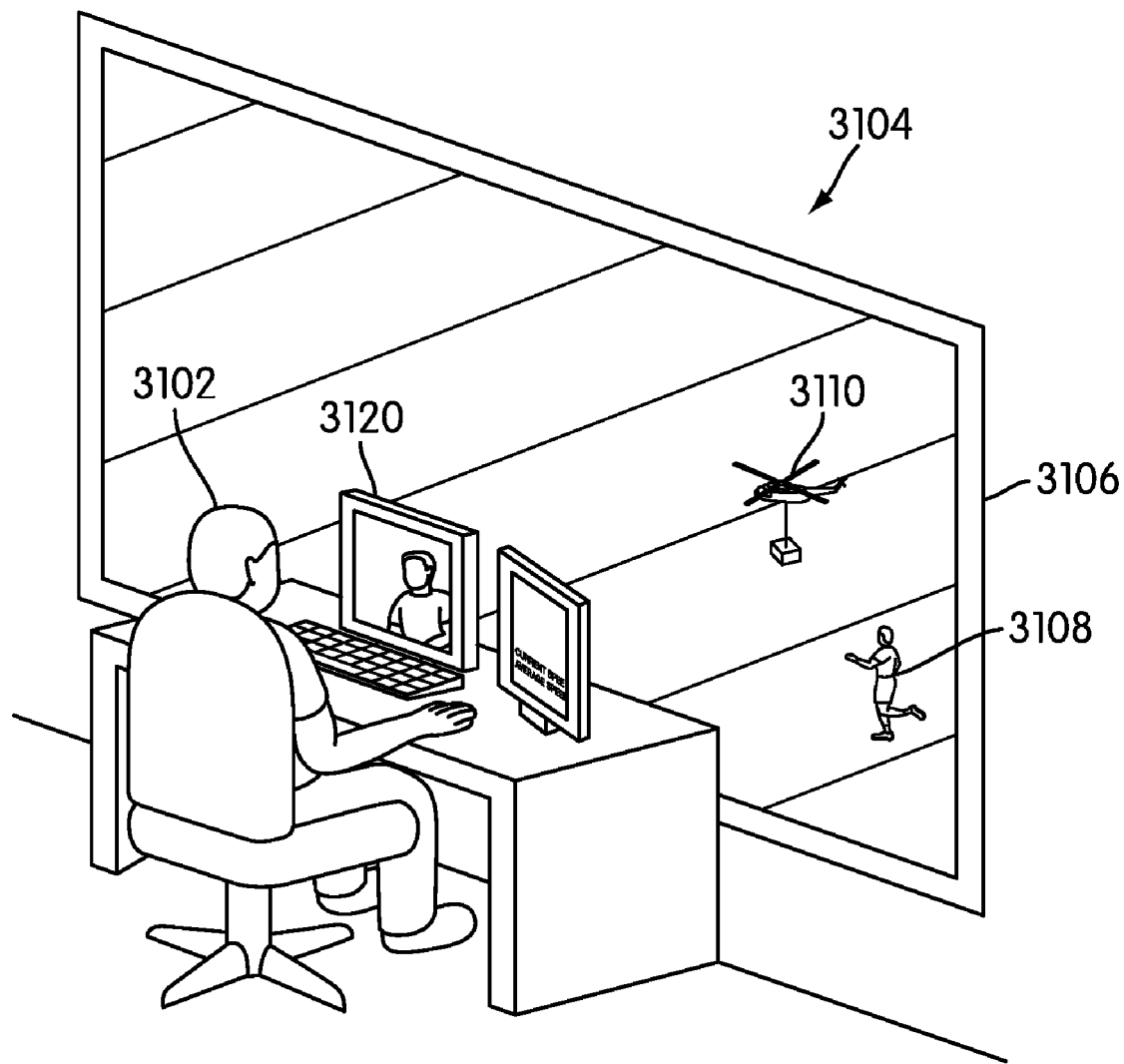
FIG. 31 is a preferred embodiment of a real-time display system.

Referring to FIG. 31, in some embodiments, real time information associated with an athlete's performance may be displayed on a computer or similar device. In the current embodiment, coach 3102 is standing in box suite 3104 of a stadium overlooking practice field 3106. Preferably, athlete 3108 is chasing mobile unit 3110 on practice field 3106. In this preferred embodiment, mobile unit 3110 is a helicopter. In other embodiments, mobile unit 3110 could make use of any type of mobility system, including the various mobility systems previously discussed. In still other embodiments, a projected target could be used instead of a mobile unit.

Preferably, real-time information regarding the performance of athlete 3108 is transmitted wirelessly to laptop 3120. This real-time information could include any information received by various sensors configured to monitor the motion, and in particular the speed, of athlete 3108. Using this real-time information, coach 3102 could, in some cases, manually edit the training path of mobile unit 3110 using laptop 3120 that is in communication with mobile unit 3110. Although mobile unit 3110 is preferably configured to automatically adjust the training path according to the weaknesses of athlete 3108, as discussed in previous embodiments, by observing athlete 3108 in real-time, coach 3102 could override these automatic adjustments as well.

Figure 32:
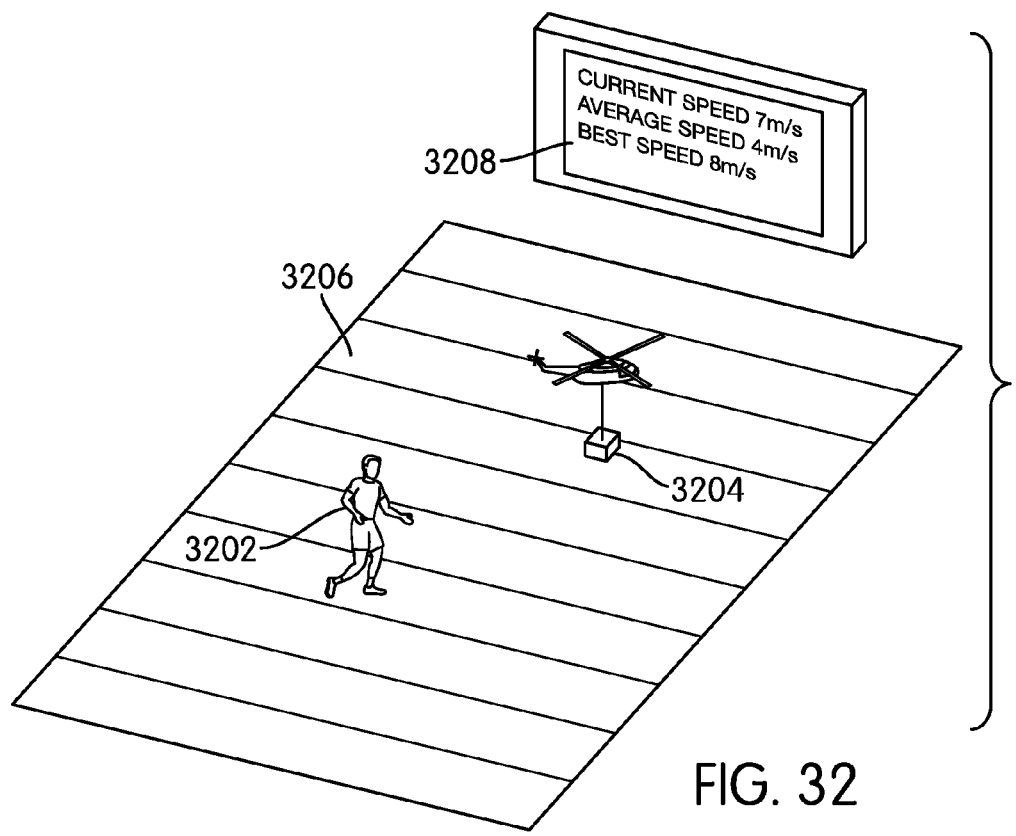
FIG. 32 is a preferred embodiment of a real-time display system.

Referring to FIG. 32, in some embodiments real-time information associated with the performance of an athlete could be displayed on any monitors nearby a practice field. In the current embodiment, as athlete 3202 chases mobile unit 3204 on practice field 3206, real-time information is displayed on large monitor 3208. In some cases, large monitor 3208 may be a 'jumbotron'. In other embodiments, real-time information could be displayed on various other monitors associated with practice field 3206, including any screens used for advertisements during games and replay monitors that are typically used by referees during games.

Figure 33:
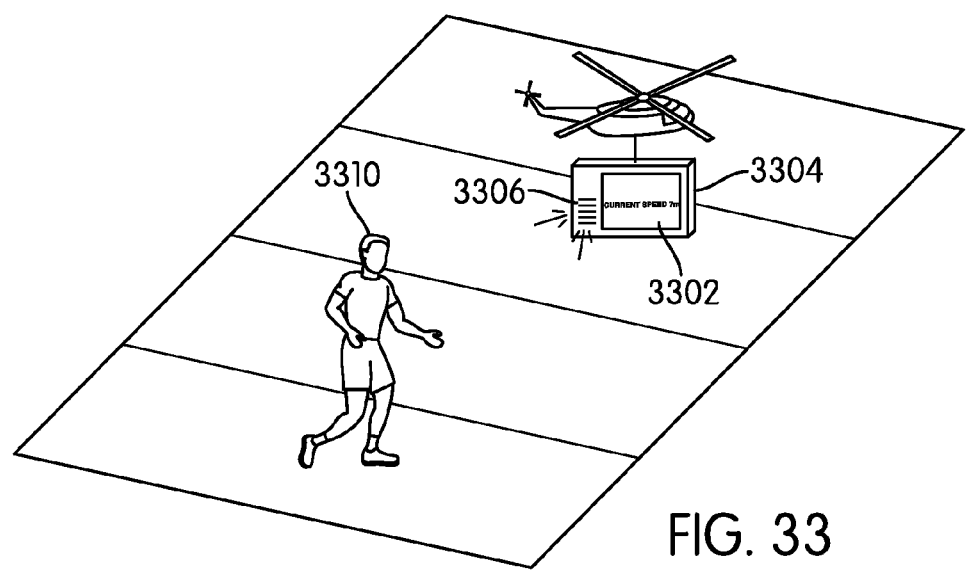
FIG. 33 is a preferred embodiment of a real-time display system.

In some embodiments, a mobile unit may include provisions for projecting real-time stats onto a display screen associated with the mobile unit. In FIG. 33, real-time information is scrolling across display 3302 of mobile unit 3304. Additionally, in some embodiments, real-time information may be vocalized through speakers 3306. Provisions for associating display 3302 and speakers 3306 with a mobile unit have been previously discussed. With this preferred arrangement, athlete 3310 could view real-time information regarding his or her current performance.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A mobile unit configured to train an athlete, comprising:
at least one port configured to receive information associated with an athlete during a training session;
a control unit receiving an initial training program into a database associated with the control unit, wherein the initial training program includes instructions for moving the mobile unit according to an initial training path designed to target a group of athletic skills of an athlete during the training session;
wherein the control unit recalls the instructions of the initial training program from the database so that the control unit can adjust the motion of the mobile unit according to the instructions of the training program;
wherein the control unit analyzes the information associated with the athlete to evaluate the athlete's performance of a specific athletic skill chosen from the group of athletic skills and adjusts the motion of the mobile unit by determining a new training program that includes instructions for moving the mobile unit according to a new training path during the training session to target the specific athletic skill; and
wherein the mobile unit is suspended above a practice field.

2. The mobile unit according to claim 1, wherein the mobile unit is suspended from a cable system.

3. The mobile unit according to claim 1, wherein the mobile unit is suspended from a system of tracks.

4. The mobile unit according to claim 1, wherein the mobile unit is suspended from a balloon.

5. The mobile unit according to claim 1, wherein the mobile unit is associated with a remote controlled helicopter.

6. The training system according to claim 1, wherein the group of athletic skills comprises a first athletic skill and a second athletic skill, and
wherein the control unit selects which of the first athletic skill and the second athletic skill comprises the specific athletic skill by evaluating the athlete's performance of the first athletic skill to determine a first result and the athlete's performance of the second athletic skill to determine a second result, and
wherein the control unit compares the first result and the second result to determine a relative ranking of the first result and the second result, wherein the worst result achieves a lowest ranking, and
wherein the control unit selects the athletic skill associated with the worst result to be the specific athletic skill.

7. A training system configured to train an athlete, comprising:
a mobility system comprising at least one cable and configured to suspend a mobile unit above an athlete;
the mobile unit including a control unit;
a data storage device associated with the control unit, wherein the data storage device is configured to receive initial training path information;
wherein the initial training path information is stored in the data storage device, wherein the initial training path information includes a series of initial instructions regarding the speed and direction of motion of the mobile unit;
wherein the control unit recalls the series of initial instructions from the data storage device so that the control unit can move the mobile unit according to the series of initial instructions;
a cable driver associated with the mobile unit and the control unit;
wherein the cable driver moves the mobile unit according to at least a first instruction in the series of initial instructions;
a sensor system, wherein the sensor system gathers information related to an initial performance of the group of athletic skills by the athlete;
wherein the control unit analyzes the initial performance of the group of athletic skills to select a particular athletic skill that requires improvement;
wherein the control unit determines a series of new instructions regarding the speed and direction of motion of the mobile unit;
wherein the new instructions are purposefully selected by the control unit to target the particular athletic skill; and
wherein the control unit directs the mobile unit to move according to the series of new instructions.

8. The training system according to claim 7, further comprising a second control unit located remotely from the mobile unit, wherein the at least one cable is an optical cable, and wherein the optical cable is a communications link between the second control unit and the mobile unit.

9. The training system according to claim 7, wherein the mobile unit is suspended above a practice field so that the mobile unit is capable of being moved over an entirety of the practice field.

10. The training system according to claim 7, wherein the mobile unit includes at least one device configured to transmit and receive information from a sensor system associated with the athlete.

11. The training system according to claim 7, wherein the mobile unit comprises a humanoid dummy.

12. The training system according to claim 11, wherein the humanoid dummy extends downward from the mobile unit.

13. The training system according to claim 7, the cable driver is associated with the at least one cable, wherein the control unit moves the mobile unit by actuating the cable driver and causing the cable driver to move the at least one cable.

14. The training system according to claim 13, wherein the at least one cable is wound around a pulley, and the cable driver rotates the pulley to adjust a length of the at least one cable.

* * * * *